(12) United States Patent
Liu et al.

(10) Patent No.: US 10,349,124 B2
(45) Date of Patent: *Jul. 9, 2019

(54) METHOD AND SYSTEM FOR INTERACTING WITH AUDIENCE OF MULTIMEDIA CONTENT

(71) Applicant: Tencent Technology (Shenzhen) Company Limited, Shenzhen (CN)

(72) Inventors: Hailong Liu, Shenzhen (CN); Dadong Xie, Shenzhen (CN); Jie Hou, Shenzhen (CN); Bo Chen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/007,680

(22) Filed: Jun. 13, 2018

(65) Prior Publication Data

US 2018/0295412 A1 Oct. 11, 2018

Related U.S. Application Data

(63) Continuation of application No. 15/190,026, filed on Jun. 22, 2016, now Pat. No. 10,028,013, which is a
(Continued)

(30) Foreign Application Priority Data

Jun. 13, 2014 (CN) .......................... 2014 1 0265948

(51) Int. Cl.
*H04N 21/439* (2011.01)
*G06F 16/438* (2019.01)
(Continued)

(52) U.S. Cl.
CPC ....... *H04N 21/4394* (2013.01); *G06F 16/438* (2019.01); *H04L 43/106* (2013.01);
(Continued)

(58) Field of Classification Search
None
See application file for complete search history.

(56) References Cited

U.S. PATENT DOCUMENTS

2007/0016918 A1* 1/2007 Alcorn .............. G06F 17/30743
725/22
2009/0037947 A1 2/2009 Patil
(Continued)

FOREIGN PATENT DOCUMENTS

CN 102572515 A 7/2012
CN 102868922 A 1/2013
(Continued)

OTHER PUBLICATIONS

Tencent Technology, ISRWO, PCT/CN2015/071772, Apr. 27, 2015, 8 pgs.
(Continued)

*Primary Examiner* — Omar S Parra
(74) *Attorney, Agent, or Firm* — Morgan, Lewis & Bockius LLP

(57) ABSTRACT

A method of presenting interactive content at a client device is disclosed. The client device records, in real-time, an audio stream of a piece of multimedia content broadcast by a content display device and sends an audio fingerprint of the piece of the multimedia content to a server. The server then determines, based on the audio fingerprint, an identifier of the piece of multimedia content, retrieves, based on the identifier of the piece of multimedia content, interactive content associated with the piece of multimedia content, and returns the interactive content associated with the piece of
(Continued)

multimedia content to the client device. After receiving, from the server, the interactive content associated with the piece of multimedia content, the client device renders the interactive content to the user of the client device.

20 Claims, 10 Drawing Sheets

Related U.S. Application Data continuation of application No. PCT/CN2015/071772, filed on Jan. 28, 2015.

(51) Int. Cl.

| | | |
|---|---|---|
| H04N 21/237 | (2011.01) | |
| H04N 21/414 | (2011.01) | |
| H04N 21/422 | (2011.01) | |
| H04N 21/4223 | (2011.01) | |
| H04N 21/4722 | (2011.01) | |
| H04N 21/8352 | (2011.01) | |
| H04L 12/26 | (2006.01) | |
| H04L 29/06 | (2006.01) | |
| H04L 29/08 | (2006.01) | |
| H04N 21/234 | (2011.01) | |
| H04N 21/44 | (2011.01) | |
| H04N 21/478 | (2011.01) | |
| H04N 21/4782 | (2011.01) | |
| H04N 21/81 | (2011.01) | |

(52) U.S. Cl.
CPC .......... *H04L 65/4076* (2013.01); *H04L 67/02* (2013.01); *H04N 21/237* (2013.01); *H04N 21/23418* (2013.01); *H04N 21/41407* (2013.01); *H04N 21/4223* (2013.01); *H04N 21/42203* (2013.01); *H04N 21/44008* (2013.01); *H04N 21/4722* (2013.01); *H04N 21/4782* (2013.01); *H04N 21/47815* (2013.01); *H04N 21/812* (2013.01); *H04N 21/8352* (2013.01)

(56) References Cited

U.S. PATENT DOCUMENTS

| | | |
|---|---|---|
| 2012/0240151 A1 | 9/2012 | Tapper |
| 2013/0160038 A1 | 6/2013 | Slaney et al. |
| 2014/0136596 A1 | 5/2014 | Watfa et al. |
| 2015/0189347 A1* | 7/2015 | Oztaskent .......... H04N 21/2665 725/32 |
| 2017/0155964 A1* | 6/2017 | Oztaskent .......... H04N 21/4828 |

FOREIGN PATENT DOCUMENTS

| | | |
|---|---|---|
| CN | 103096128 A | 5/2013 |
| CN | 103475943 A | 12/2013 |
| CN | 103501464 A | 1/2014 |
| CN | 103763586 A | 4/2014 |
| CN | 104023251 A | 9/2014 |
| EP | 2388721 A1 | 11/2011 |

OTHER PUBLICATIONS

Tencent Technology, IPRP, PCT/CN2015/071772, Dec. 15, 2016, 6 pgs.

* cited by examiner

METHOD AND SYSTEM FOR INTERACTING WITH AUDIENCE OF MULTIMEDIA CONTENT

PRIORITY CLAIM AND RELATED APPLICATION

This application is a continuation of U.S. application Ser. No. 15/190,026, entitled "METHOD AND SYSTEM FOR INTERACTING WITH AUDIENCE OF MULTIMEDIA CONTENT" filed on Jun. 22, 2016, which is a continuation application of PCT Patent Application No. PCT/CN2015/071772, entitled "METHOD AND SYSTEM FOR INTERACTING WITH AUDIENCE OF MULTIMEDIA CONTENT" filed on Jan. 28, 2015, which claims priority to Chinese Patent Application Serial No. 201410265948.X, entitled "Method and System for Video-Based Interaction with Audience", filed on Jun. 13, 2014, all of which are incorporated herein by reference in their entirety.

FIELD OF THE APPLICATION

The present application generally relates to the field of computer technologies, and more particularly to a method and related device and system for interacting with an audience of multimedia content.

BACKGROUND

Nowadays multimedia content such as audios and videos have become an essential part of people's everyday life. An audience can receive different types of multimedia content via various methods such as watching TV, listening to radio, visiting websites that host videos or audios, etc. As a result of receiving the multimedia content, an audience may generate interest towards a service or an item of merchandise associated with the multimedia content. Currently, in order to gain more information of the service or merchandise, the audience generally needs to search one or more keywords associated with the service or merchandise (e.g., using a search engine website). Such a known approach of interacting with multimedia content (i.e., searching keywords after receiving multimedia content), however, typically causes delays in the interactions of the audience with the multimedia content. This can potentially reduce the possibility of converting the audience's interest towards the service or merchandise into subsequent commercial activities (e.g., purchasing the service or merchandise).

Thus, a need exists for a method and system that can enable an audience to interact with multimedia content in substantially real time or with insignificant delays.

SUMMARY

The above deficiencies associated with the known approach of interacting with multimedia content may be reduced or eliminated by the techniques described herein.

In some embodiments, a method for interacting with an audience of multimedia content is disclosed. The method is performed at a server device, which includes one or more processors and memory for storing programs to be executed by the one or more processors. The method includes receiving, from a client device, data associated with a piece of multimedia content presented to a user of the client device. The piece of multimedia content is from a set of pieces of multimedia content. The data associated with the piece of multimedia content is obtained at the client device in response to an instruction provided to the client device by the user of the client device. In some instances, the piece of multimedia content is a video clip or an audio clip, and the data associated with the piece of multimedia content includes an audio fingerprint of the piece of multimedia content.

The method includes determining, based on the data, an identifier of the piece of multimedia content from a set of identifiers for the set of pieces of multimedia content. Each identifier from the set of identifiers identifies at least one piece of multimedia content from the set of pieces of multimedia content. In some instances, the data includes an audio fingerprint of the piece of multimedia content. In such instances, the determining the identifier of the piece of multimedia content can include, for example, comparing the audio fingerprint included in the data with a set of audio fingerprints of the set of pieces of multimedia content, where each audio fingerprint from the set of audio fingerprint uniquely identifies a piece of multimedia content from the set of pieces of multimedia content.

The method also includes retrieving, based on the identifier of the piece of multimedia content, interactive content associated with the piece of multimedia content. In some instances, the interactive content includes an interactive webpage associated with the piece of multimedia content. In some instances, the piece of multimedia content is an advertisement being presented to the audience, and the data associated with the piece of multimedia content includes an audio fingerprint of the advertisement. In such instances, the interactive content can be configured to, for example, enable the user of the client device to purchase a product associated with the advertisement. Moreover, the method further includes sending the interactive content to the client device such that the client device presents the interactive content to the user of the client device.

In some instances, the set of pieces of multimedia content are presented to the audience via a group of channels. In such instances, the method can include receiving signals of the multimedia content, and periodically determining, based on the received signals, audio fingerprints of the multimedia content. The method can further include storing the audio fingerprints into a real-time audio fingerprint database such that an audio fingerprint associated with the multimedia content presented via each channel from the group of channels that is stored in the real-time audio fingerprint database is periodically updated.

In the instances described above, the data can include an audio fingerprint and a timestamp of the piece of multimedia content. Determining the identifier of the piece of multimedia content can include comparing the audio fingerprint included in the data with the audio fingerprints stored in the real-time audio fingerprint database to determine a channel from the group of channels via which the piece of multimedia content is presented. Determining the identifier of the piece of multimedia content can further include determining, based on the channel and the timestamp included in the data, the identifier of the piece of multimedia content from a predefined database of multimedia content. In some instances, the predefined database of multimedia content stores an identifier of each piece of multimedia content from the set of pieces of multimedia content, and information of at least a channel and a time duration of each piece of multimedia content from the set of pieces of multimedia content.

In some embodiments, a server device includes one or more processors and memory storing one or more programs for execution by the one or more processors. The one or more programs include instructions that cause the server device to perform the method for interacting with multimedia content as described above. In some embodiments, a non-transitory computer readable storage medium stores one or more programs including instructions for execution by one or more processors. The instructions, when executed by the one or more processors, cause the processors to perform the operations of interacting with multimedia content as described above.

BRIEF DESCRIPTION OF DRAWINGS

The aforementioned features and advantages of the present application as well as additional features and advantages thereof will be more clearly understood hereinafter as a result of a detailed description of preferred embodiments when taken in conjunction with the drawings.

Like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

To promote an understanding of the objectives, technical solutions, and advantages of the present application, embodiments of the present application are further described in detail below with reference to the accompanying drawings.

Figure 1:
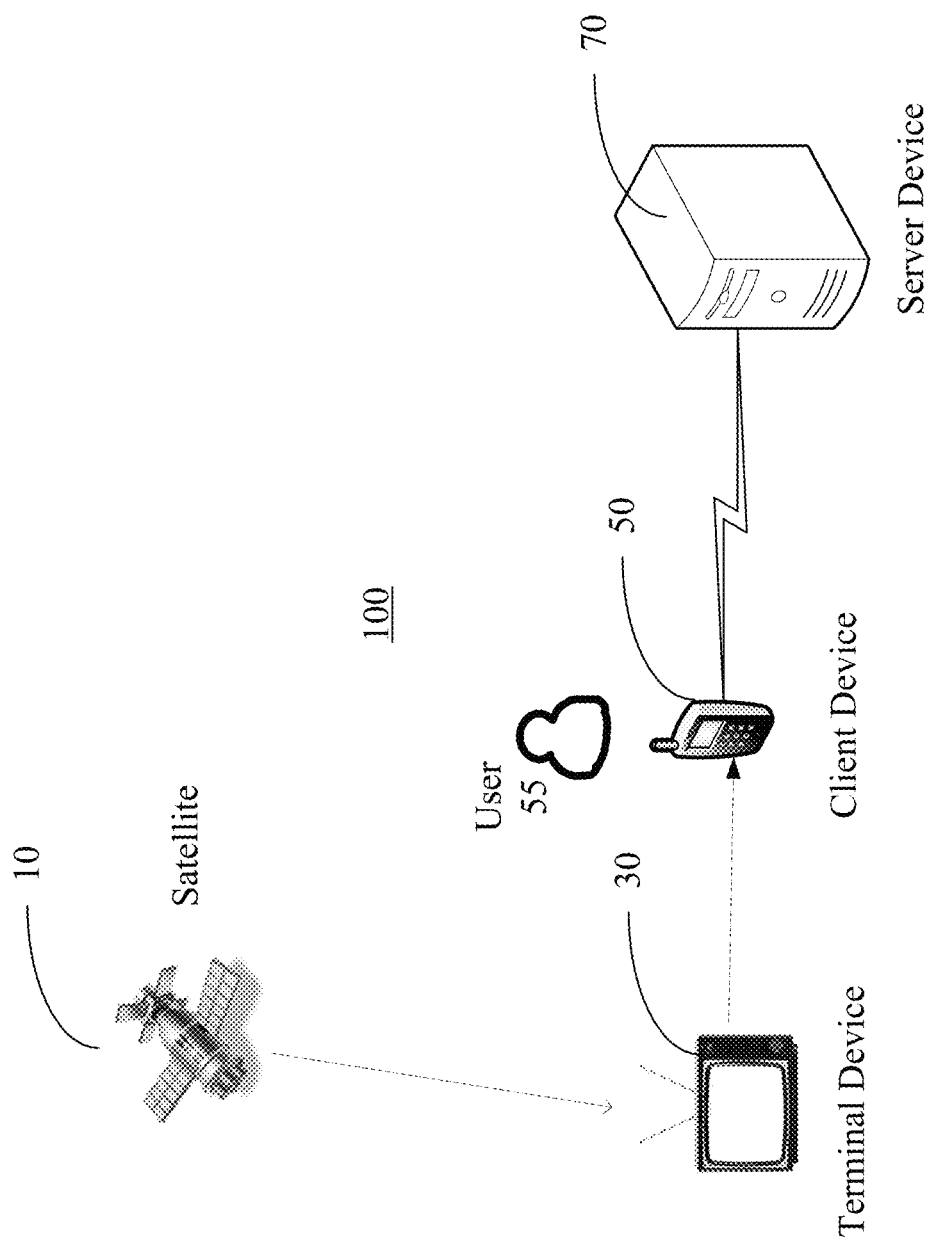
FIG. 1 is a schematic diagram illustrating a system configured to enable a user to interact with multimedia content in accordance with some embodiments.

FIG. 1 is a schematic diagram illustrating a system 100 configured to enable a user to interact with multimedia content in accordance with some embodiments. As shown in FIG. 1, the system 100 includes a server device 70, a client device 50, and a terminal device 30. The server device 70 is operatively coupled to and communicates with the client device 50 via one or more networks (not shown in FIG. 1). The terminal device 30 receives multimedia content from a source of multimedia content such as, for example, a satellite 10. The terminal device 30 then presents the received multimedia content to the user 55. Additionally, as shown in FIG. 1, the client device 50 is operated by a user 55, which can be any person receiving the multimedia content presented by the terminal device 30 and interested in interacting with the received multimedia content.

Specifically, the terminal device 30 can be any type of electronic device configured to present multimedia content to users (e.g., the user 55) of the terminal device 30. The multimedia content presented by the terminal device 30 can be one or more types of multimedia content such as, for example, web-based video clips, TV-based video programs, web-based audio clips, broadcasted radio, and/or any other suitable type of multimedia content. Correspondingly, the terminal device 30 can be, for example, a computer (equipped with a web browser, media player, speaker, etc.), a TV, a radio receiver, and/or any other suitable device to receive and present multimedia content.

In some embodiments, as shown in FIG. 1, the terminal device 30 can receive the multimedia content (e.g., video content, audio content, etc.) from the satellite 10. In such embodiments, the terminal device 30 is equipped with a wireless receiver (e.g., an antenna) configured to receive wireless communication signals from the satellite 10. In other embodiments, the terminal device 30 is configured to receive multimedia content from a source of multimedia content in any other suitable method (e.g., via a TV cable, a cellular network, the Internet, etc.)

In some embodiments, audience of the multimedia content presented by the terminal device 30 can be an individual user (e.g., the user 55) or a large number of users. For example, the terminal device 30 can be a TV configured to show TV programs in a home of a user (e.g., the user 55). For another example, the terminal device 30 can be a big-screen display in a shopping mall configured to play commercial advertisements to customers in the shopping mall. For yet another example, the terminal device 30 can be a radio receiver in a transportation tool (e.g., a boat, a vehicle, a train, a plane, etc.) configured to broadcast radio to passengers in the transportation tool.

The client device 50 can be any type of electronic device configured to function as a client-side device to enable users (e.g., the user 55) to interact with the multimedia content presented by the terminal device 30. In some embodiments, such a client device can be, for example, a cellular phone, a smart phone, a mobile Internet device (MID), a personal digital assistant (PDA), a palmtop computer, a tablet computer, an e-reader, a laptop computer, a handheld computer, a wearable device, a desktop computer, a vehicle terminal, a portable electronic device, a controller of a smart TV or a display device, and/or the like. In some embodiments, such a client device can be referred to as, for example, a terminal device, a user device, a mobile device, a portable device, a personal electronic device, and/or the like.

In some embodiments, the client device 50 includes a device or a component (e.g., a microphone, an audio recorder) capable of receiving and capturing (e.g., recording) audio content of the multimedia content presented by the terminal device 30. In such embodiments, as described below, the client device 50 is configured to capture audio content of the multimedia content in association with enabling users (e.g., the user 55) to interact with the multimedia content. Details of a client device are shown and described below with respect to FIGS. 7-9 and 11.

The server device 70 can be any type of device configured to function as a server-side device to enable users (e.g., the user 55) to interact with the multimedia content presented by the terminal device 30. Such a server device 70 can typically be configured to communicate with multiple client devices (e.g., the client device 50) via one or more networks. In some embodiments, the server device 70 can be, for example, a background server, a back end server, a database server, a workstation, a desktop computer, a cloud computing server, a data processing server, and/or the like. In some embodiments, the server device 70 can be a server cluster or server center consisting of two or more servers (e.g., a data processing server and a database server). Details of a server device are shown and described below with respect to FIGS. 9-13.

Although not shown in FIG. 1, a network connecting a client device (e.g., the client device 50) and a server device (e.g., the server device 70) can be any type of network configured to operatively couple one or more client devices to one or more server devices, and enable communications between the client device(s) and the server device(s). In some embodiments, such a network can include one or more networks such as, for example, a cellular network, a satellite network, a local area network (LAN), a wide area network (WAN), a wireless local area network (WLAN), the Internet, etc. In some embodiments, such a network can be optionally implemented using any known network protocol including various wired and/or wireless protocols such as, for example, Ethernet, universal serial bus (USB), global system for mobile communications (GSM), enhanced data GSM environment (EDGE), general packet radio service (GPRS), long term evolution (LTE), code division multiple access (CDMA), wideband code division multiple Access (WCDMA), time division multiple access (TDMA), Bluetooth, Wi-Fi, voice over internet protocol (VoIP), Wi-MAX, etc.

Figure 2:
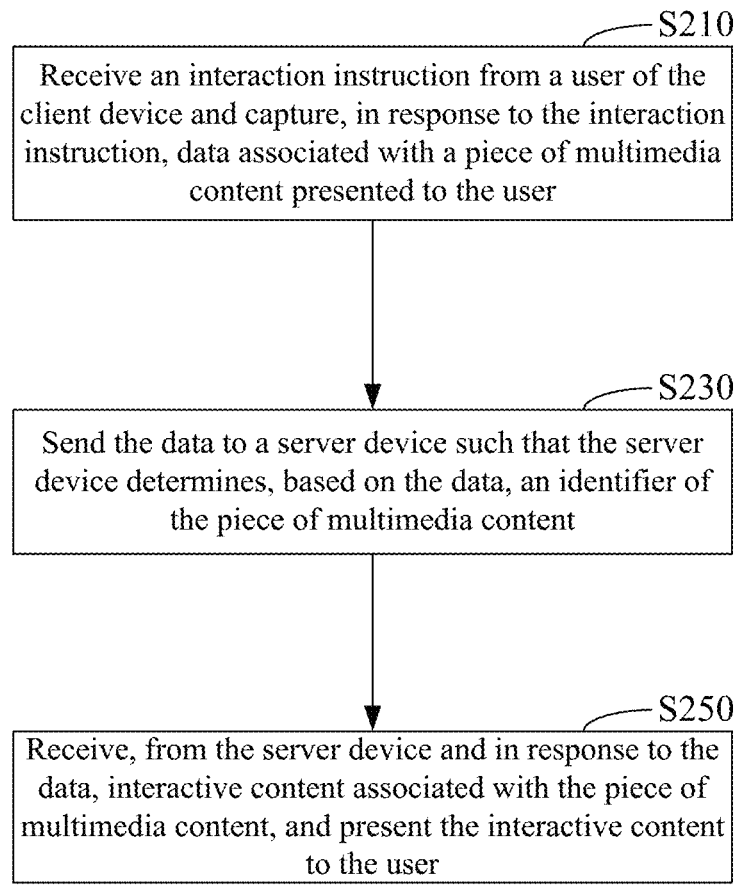
FIG. 2 is a flowchart illustrating a method performed at a client device for enabling a user to interact with multimedia content in accordance with some embodiments.

FIG. 2 is a flowchart illustrating a method 200 performed at a client device for enabling a user to interact with multimedia content in accordance with some embodiments. The client device performing the method 200 is similar to the client device 50 shown and described above with respect to FIG. 1. Particularly, the client device is operated by a user (e.g., the user 55 in FIG. 1), who receives multimedia content presented by a terminal device (e.g., the terminal device 30 in FIG. 1). Furthermore, the client device is operatively coupled to and communicates with a server device similar to the server device 70 shown and described above with respect to FIG. 1.

In some embodiments, the client device performing the method 200 can include one or more processors and memory. In such embodiments, the method 200 can be implemented using instructions or code of an application that are stored in a non-transitory computer readable storage medium of the client device and executed by the one or more processors of the client device. The application is associated with enabling a user to interact with multimedia content presented by a terminal device. Such an application typically has a client-side portion that is stored in and/or executed at the client device, and a server-side portion that is stored in and/or executed at the server device operatively coupled to and communicating with the client device. As a result of the client-side portion of the application being executed, the method 200 is performed at the client device. As shown in FIG. 2, the method 200 includes the following steps.

At S210, the client device receives an interaction instruction from the user of the client device. Such an interaction instruction can be entered by the user in response to receiving a piece of multimedia content currently presented by the terminal device that draws interest of the user. In some embodiments, the user can enter an interaction instruction to the client device (e.g., a smart phone, a laptop computer, a PDA, a touchpad, etc.) in response to, for example, watching an advertisement on a TV, listening to a radio program, watching a video clip provided by a website, and/or the like. In some embodiments, the user can provide an interaction instruction by, for example, pressing a button on a user interface displayed at the client device, generating and entering a voice command to the client device, initiating an application installed and executed at the client device, or using any other suitable method.

The client device then captures, in response to the interaction instruction, data associated with the piece of multimedia content presented to the user. In some embodiments, the data associated with the piece of multimedia content includes audio data of the piece of multimedia content. For example, the user can use a webcam or a video camera of the client device to record a video clip from the piece of multimedia content (e.g., a video clip, a TV show, etc.) being presented at the terminal device to the user. For another example, the user can use a recorder of the client device to record an audio recording from the piece of multimedia content (e.g., an audio clip, a radio program, etc.) being presented at the terminal device to the user. In some embodiments, the data associated with the piece of multimedia content can optionally include a video or image of the piece of multimedia content.

In some embodiments, the client device can be configured to extract, from the captured audio data of the piece of multimedia content, an audio fingerprint of the piece of multimedia content. In such embodiments, the client device can implement any suitable method or algorithm to extract the audio fingerprint of the piece of multimedia content. Moreover, the data associated with the piece of multimedia content can include the audio fingerprint of the piece of multimedia content that is extracted at the client device based on the captured audio data of the piece of multimedia content.

At S230, the client device sends the data to the server device such that the server device determines, based on the data, an identifier of the piece of multimedia content. In some embodiments, each different piece of multimedia content is identified by a unique identifier. That is, each identifier can be used to link to a unique piece of multimedia content. In some other embodiments, more than one different pieces of multimedia content can be identified by a common identifier. For example, multiple different commercial advertisements of a product can be identified by the same identifier.

In some embodiments, the server device is configured to determine the identifier of the piece of multimedia content based on the audio fingerprint of the piece of multimedia content that is received from the client device. In other embodiments, the server device can determine the identifier of the piece of multimedia content based on any other data associated with the piece of multimedia content that is received from the client device. In some embodiments, the data associated with the piece of multimedia content (e.g., the audio fingerprint of the piece of multimedia content) can uniquely identify the piece of multimedia content and differentiate the piece of multimedia content from other pieces of multimedia content.

At S250, the client device receives, from the server device and in response to the data, interactive content associated with the piece of multimedia content. The interactive content can be, for example, an interactive webpage associated with the piece of multimedia content that can be displayed at the client device to the user. For example, the interactive content associated with a TV commercial of an automobile can be an interactive webpage presenting an application for a test drive of the automobile at a nearby dealer. For another example, the interactive content associated with an advertisement of a beverage can be an interactive webpage including information of a lottery to win the beverage as a prize.

In some embodiments, the interactive content associated with various pieces of multimedia content is stored at a predefined database of interactive content that is accessible to the server device. In such embodiments, the server device can retrieve the interactive content based on the identifier of the piece of multimedia content that is determined at the server device (at S230).

Furthermore, the client device then presents the interactive content to the user. In some embodiments, a client device (e.g., a smart phone, a touchpad, a computer) can display the interactive content (e.g., an interactive webpage) at a display device (e.g., a screen, a monitor) of the client device. In some other embodiments, a client device (e.g., a controller of a smart TV) can display the interactive content (e.g., an interactive webpage) at an external display device such as, for example, a display device of the terminal device (e.g., the screen of the smart TV).

In some embodiments, different pieces of multimedia content can be associated with the same interactive content. In such embodiments, for example, the same interactive webpage can be presented to the user when the user instructs to interact with any of the different advertisements of the same product. In some embodiments, the same piece of multimedia content can be associated with different interactive content. In such embodiments, for example, an interactive webpage can be randomly (or in any other suitable method) selected from a group of interactive webpages and presented to the user when the user instructs to interact with an advertisement of a product.

Figure 3:
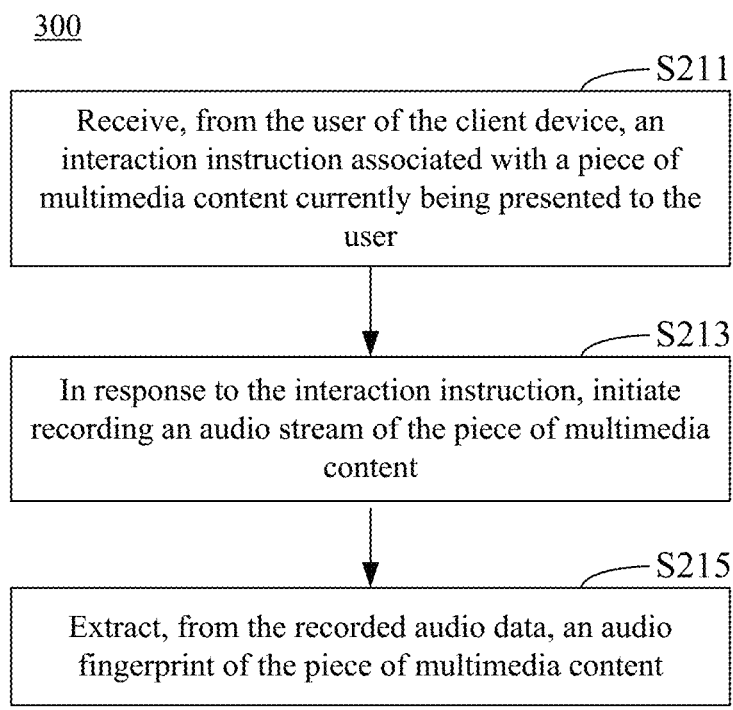
FIG. 3 is a flowchart illustrating a method performed at a client device for capturing data of multimedia content in performing the method of FIG. 2.

FIG. 3 is a flowchart illustrating a method 300 for capturing data of multimedia content in performing the method 200 of FIG. 2. The method 300 can be performed by the client device that performs the method 200 as described above with respect to FIG. 2. Operations of the method 300 correspond to the operations in performing S210 of the method 200. As shown in FIG. 3, the method 300 includes the following steps.

At S211, the client device receives, from the user of the client device, the interaction instruction associated with the piece of multimedia content currently being presented to the user. At S213, in response to the interaction instruction, the client device initiates recording an audio stream of the piece of multimedia content. The client device can be configured to record the audio stream of the piece of multimedia content using any suitable recording method. In some embodiments, for example, the client device can sample the audio stream of the piece of multimedia content with a sampling frequency of 8 kHz, and then quantize the sampled data with 16 bits to generate the digital audio data.

At S215, the client device extracts, from the recorded audio data, an audio fingerprint of the piece of multimedia content. Such an audio fingerprint may be a compact unique content-based digital signature of the audio data recorded from the piece of multimedia content. Features or parameters of an audio fingerprint typically include, for example, robustness, reliability, fingerprint size, granularity, search speed, scalability, etc. As an example, extracting the audio fingerprint from the recorded audio data can include the following operations.

(1) Segment the recorded audio data into multiple frames in the time-domain to generate multi-frame audio signals. Specifically, various window functions (e.g., Hamming window, Hanning window, Gaussian window, etc.) can be used as a parameter to segment the audio data into frames. For example, the client device can use a Hamming window w(n) is defined as:

$$w(n) = 0.54 - 0.46\cos\left(\frac{2n\pi}{N-1}\right), 0 \le n \le N-1.$$

(2) Perform Short-Time Fourier Transform (STFT) on each frame of the audio signals to generate a frequency spectrum (in the frequency domain) of that frame of the audio signals (in the time domain). The resulted frequency spectrum X(m) is:

$$X(m) = \sum_{n=0}^{N-1} w(n)x(n)e^{-\frac{j2\pi mn}{N}},$$

where j is the parameter corresponding to the window function, and N is the number of data points used in the STFT (e.g., N=1024).

(3) Extract an amplitude spectrum for each frame of the audio signals, and then generate a two-dimensional spectrogram based on the time, frequency spectrum and amplitude spectrum of each frame of the audio signals. The resulted two-dimensional spectrogram S(t, f) can be calculated as S(t, f)=|X(t, f)|.

(4) Perform time-based modulo calculation on the two-dimensional spectrogram to generate a group of a predefined number of sub-spectrograms, where each sub-spectrogram from the group of sub-spectrograms corresponds to a phase channel of the audio signals. The predefined number of sub-spectrograms (denoted as M) can be a configurable positive integer. The two-dimensional spectrogram is then segmented based on the result of the time t mod M. As a result, a number of M sub-spectrograms are generated as: $S^k$(t, f), where k=1, 2, . . . , M.

(5) Identify at least one peak characteristic point for each phase channel from the M phase channels. The at least one peak characteristic point for each phase channel forms a sequence of peak characteristic points for that phase channel. Specifically, for example, for each phase channel from the Mphase channels, identifying the at least one peak characteristic point can include: a) calculating an energy value for each characteristic point of the sub-spectrogram corresponding to that phase channel; b) based on the calculated energy values, identifying a characteristic point that has the highest energy value among all the characteristic points within a certain rectangle area in the sub-spectrogram as a peak characteristic point for that phase channel; and c) repeating the operation of b) for each such rectangle area in the sub-spectrogram to identify all the peak characteristic points for that phase channel. In such a method, the size of the certain rectangle area can be adjusted depending on the specific circumstances. In some embodiments, the at least one peak characteristic point can be identified for each sub-spectrogram using other suitable methods or algorithms.

As a result, at least one peak characteristic point can be identified for each phase channel from the M phase channels. The at least one peak characteristic point can then be reordered to form the sequence of peak characteristic points for the corresponding phase channel. Such a reordering can be performed in any suitable method. For example, the peak characteristic points can be ordered based on the time of each peak characteristic point (e.g., a peak characteristic point with an earlier time is placed to a position ahead of another peak characteristic point with a later time). Moreover, for multiple peak characteristic points with the same time (or substantially the same time), the multiple peak characteristic points can be ordered based on the frequency of each peak characteristic point (e.g., a peak characteristic point with a higher frequency is placed to a position ahead of another peak characteristic point with a lower frequency).

(6) Make a pair for each peak characteristic point in the sequence of peak characteristic points for each phase channel to generate a sequence of pairs of peak characteristic points for that phase channel. Specifically, assume $S^n$ ($t_k$, $f_k$) denotes an arbitrary peak characteristic point in the sequence of peak characteristic points for an arbitrary phase channel, where n represents an index of the phase channel in the M phase channels (0<n≤M); k represents an index of the peak characteristic point in the sequence of peak characteristic points (k is a positive integer); $t_k$ represents the time of the peak characteristic point; and $f_k$ represents the frequency of the peak characteristic point.

As an example, for each peak characteristic point in the sequence of peak characteristic points for a phase channel from the Mphase channels (assume such a peak characteristic point is denoted as $S^n$ ($t_k$, $f_k$), the pairing for that peak characteristic point can be performed in the following steps:
a) Use the peak characteristic point $S^n$ ($t_k$, $f^k$) as an anchor to select a targeted rectangle area. Such a targeted rectangle area can be defined as: $t_{start} \leq t_k \leq t_{end}$ and $f_{start} \leq f_k \leq f_{end}$, where $t_{start}$ represents a starting time for the targeted rectangle area; $t_{end}$ represents an ending time for the targeted rectangle area; $f_{start}$ represents a minimum frequency for the targeted rectangle area; and $f_{end}$ represents a maximum frequency for the targeted rectangle area.

b) Identify another peak characteristic point within the targeted rectangle area to be paired with the anchor $S^n$ ($t_k$, $f^k$). Denote the identified peak characteristic point as $S^n$ ($t_b$, $f_b$), then $S^n$ ($t_k$, $f_k$) and $S^n$ ($t_b$, $f_b$) form a pair of peak characteristic points in the sequence of pairs of peak characteristic points for the phase channel. The pairing peak characteristic point can be identified for an anchor based on any suitable principle such as, for example, the identified peak characteristic point has the minimum time difference from the anchor among all qualified peak characteristic points (i.e., all the peak characteristic points that are within the targeted rectangle area except the anchor), the identified peak characteristic point has the maximum energy value among all qualified peak characteristic points, and/or the like.

Thus, the peak characteristic points in the sequence of peak characteristic points for each phase channel can be paired to form a sequence of pairs of peak characteristic points for that phase channel. In some embodiments, peak characteristic points can be paired for each sub-spectrogram using other suitable methods or algorithms. A resulted pair of peak characteristic points can be denoted by ($t_k$, $f_k$, $\Delta f_k$, $\Delta t_k$)$_n$, where n represents an index of the phase channel in the M phase channels (0≤n≤M); k represents an index of the anchor peak characteristic point in the sequence of peak characteristic points; $\Delta t_k = t_b - t_k$ represents the difference in time between the two peak characteristic points in the pair; and $\Delta f_k = f_b - f_k$ represents the difference in frequency between the two peak characteristic points in the pair.

(7) Perform hash calculation on each sequence of peak characteristic points to generate a fingerprint sequence for the corresponding phase channel. The collection of such fingerprint sequences for the M phase channels then forms the desired audio fingerprint of the audio signals. Specifically, for a pair of peak characteristic points represented by ($t_k$, $f_k$, $\Delta f_k$, $\Delta t_k$)$_n$, ($f_k$, $\Delta f_k$, $\Delta t_k$) represents the characteristic portion of the pair of peak characteristic points, and $t_k$ represents the time when that characteristic portion occurs in the sub-spectrogram (in other words, in the audio signals).

The hash calculation can be performed on ($f_k$, $\Delta f_k$, $\Delta t_k$) to represent ($f_k$, $\Delta f_k$, $\Delta t_k$) using hash codes of a fixed bit length such as, for example, hashcode$_k$=H ($f_k$, $\Delta f_k$, $\Delta t_k$). As a result of such a hash calculation, each pair of peak characteristic points in the sequence of pairs of peak characteristic points for each phase channel can be represented by ($t_k$, hashcode$_k$)$_n$, which is a fingerprint sequence that is used in forming the audio fingerprint of the audio signals.

Figure 4:
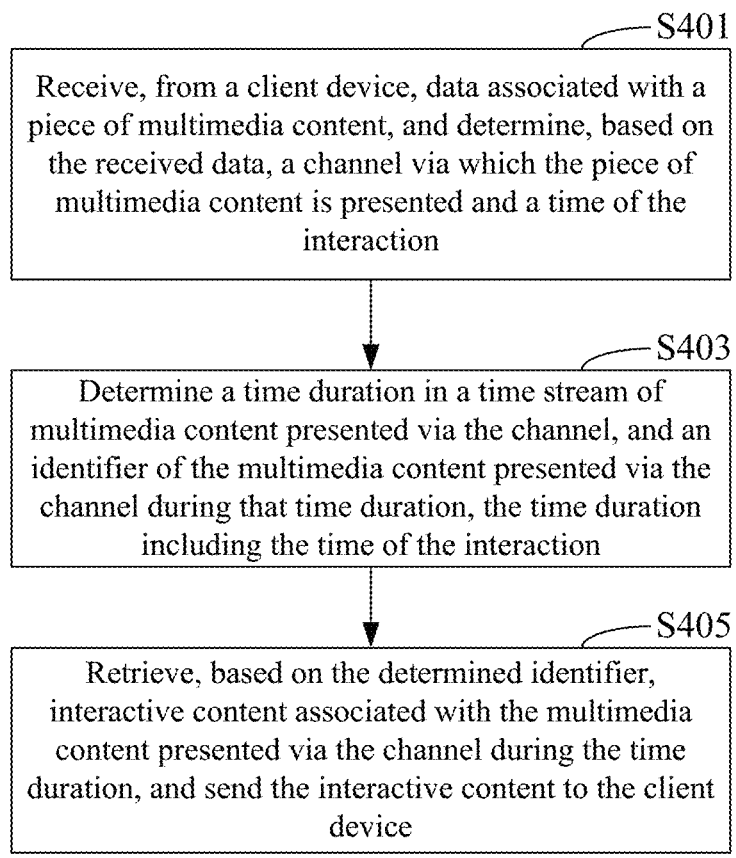
FIG. 4 is a flowchart illustrating a method performed at a server device for retrieving and sending interactive content associated with a piece of multimedia content in accordance with some embodiments.

FIG. 4 is a flowchart illustrating a method 400 performed at a server device for retrieving and sending interactive content associated with a piece of multimedia content in accordance with some embodiments. The server device performing the method 400 is similar to the server device 70 shown and described above with respect to FIG. 1. Particularly, the server device is operatively coupled to and communicates with one or more client devices that are similar to the client device 50 shown and described above with respect to FIG. 1. A client device operatively coupled to and communicating with the server device is operated by a user (e.g., the user 55 in FIG. 1), who receives multimedia content presented by a terminal device (e.g., the terminal device 30 in FIG. 1). Related to operations of S230-S250 in performing the method 200 shown and described above with respect to FIG. 2, the server device performs operations of the method 400 to retrieve and send interactive content in response to receiving data associated with the piece of multimedia content from the client device.

In some embodiments, the server device performing the method 400 can include one or more processors and memory. In such embodiments, the method 400 can be implemented using instructions or code of an application that are stored in a non-transitory computer readable storage medium of the server device and executed by the one or more processors of the server device. The application is associated with enabling a user to interact with multimedia content presented by a terminal device. Such an application typically has a client-side portion that is stored in and/or executed at each client device operatively coupled to the server device, and a server-side portion that is stored in and/or executed at the server device. As a result of the server-side portion of the application being executed, the method 400 is performed at the server device. As shown in FIG. 4, the method 400 includes the following steps.

At S401, the server device receives, from the client device, data associated with the piece of multimedia content. The server device then determines, based on the received data, a channel via which the piece of multimedia content is presented and a time of the interaction. In some embodiments, the piece of multimedia content is from multiple pieces of multimedia content that are presented via a group of channels. The group of channels can include, for example, a group of different TV channels, a group of different radio frequencies, a group of different websites hosting video content, and/or the like. In some embodiments, the group of channels can include a combination of different types of channels such as TV channels, radio frequencies, websites, etc.

In some embodiments, at any given moment, at most one piece of multimedia content from the multiple pieces of multimedia content is presented via a channel from the group of channels. In such embodiments, at any given time, a user can receive (e.g., view, watch, hear) at most one piece of multimedia content via a channel from the group of channels using one terminal device. Similarly, at any given time a user can receive more than one piece of multimedia content via multiple channels using more than one terminal device.

In some embodiments, the data associated with the piece of multimedia content that is received from the client device includes an audio fingerprint of the piece of multimedia content. In such embodiments, the server device is configured to compare the audio fingerprint of the piece of multimedia content with a group of audio fingerprints stored at a database of audio fingerprints for multiple pieces of multimedia content presented via the group of channels. The server device includes or can access such a database. As a result of the comparison, the server device determines the channel from the group of channels via which the piece of multimedia content is presented. Additionally, the server device can determine the time of the interaction.

For example, the process of comparing the received audio fingerprint of the piece of multimedia content with the audio fingerprints stored in the database of audio fingerprints for multimedia content can include the following steps.

(1) Identify, by comparing each audio fingerprint from the database with the received audio fingerprint, hash-coded pairs of peak characteristic points (e.g., hashcode$_k$) of that audio fingerprint that are the same (or substantially the same) as the hash-coded pairs of peak characteristic points of the received audio fingerprint. As a result, each hash-coded pair of peak characteristic points that is included in both the received audio fingerprint and an audio fingerprint stored in the database can be identified.

Specifically, assume the received audio fingerprint is represented by $FP_1=\{(\tau_1, h_1^1), (\tau_2, h_2^1), \ldots (\tau_M, h_M^1)\}$, and any arbitrary audio fingerprint stored in the database is represented by $FP_2=\{(t_1, h_1^2), (t_2, h_2^2), \ldots (t_N, h_N^2)\}$, where each h is a hash-coded pair of peak characteristic points, and $\tau$, t are timestamps for the hash-coded peak characteristic points. Thus, by comparing the hash-coded pairs of peak characteristic points from $FP_1$ and $FP_2$, $(\tau_i, h_i^1)$ and $(t_j, h_j^2)$ having the same h (or substantially the same h) can be determined (that is, $h_i^1=h_j^2$), and the corresponding pair of timestamps $(\tau_i, t_j)$ can be determined.

(2) Calculate the time difference for each pair of timestamps $(\tau_i, t_j)$ determined in the step (1), and then generate a histogram for the calculated time differences. Specifically, for each pair of timestamps $(\tau_i, t_j)$ calculate $\Delta t=t_j-\tau_i$.

(3) Calculate the peak height of the histogram. Such a peak height of the histogram is a match score representing the similarity of the two audio fingerprints (i.e., the received audio fingerprint $FP_1$ and the arbitrary audio fingerprint from the database $FP_2$).

(4) Determine, based on the peak height of the histogram calculated at the step (3), whether the two audio fingerprints match each other. Specifically, the calculated peak height is compared to a predefined threshold. If the calculated peak height is greater than the predefined threshold, then according to linear correlation, the corresponding histogram has an obvious peak. Thus, the two audio fingerprints are determined to match each other. Otherwise, if the calculated peak height is not greater than the predefined threshold, then according to linear correlation, the corresponding histogram has no obvious peak. Thus, the two audio fingerprints are determined not to match each other.

Additionally, in the case of a successful match being found between the received audio fingerprint and an audio fingerprint stored in the database, the time difference corresponding to the peak height in the histogram represents an offset of time between the two audio fingerprints. The time of interaction can be calculated based on such an offset of time.

Each audio fingerprint stored in the database is associated with a channel from the group of channels. That is, each audio fingerprint stored in the database represents a piece of multimedia content that is presented via an associated channel from the group of channels. Thus, by performing the steps (1)-(4) described above, the server device can determine the channel from the group of channels via which the piece of multimedia content is presented, as well as the corresponding time of the interaction.

In some embodiments, the server device can determine more than one audio fingerprint from the database, each of which matches the received audio fingerprint. The multiple matches indicate that the piece of multimedia content can be presented via more than one channel from the group of channels (at substantially or approximately the same time). In such embodiments, the server device can select one channel from the more than one channel as the one via which the user is assumed to receive the piece of multimedia content. For example, the server device can randomly select one channel from the more than one channel, or select the one channel that has the highest match score among the more than one channel.

At S403, the server device determines a time duration in a time stream of multimedia content presented via the channel, as well as an identifier of the multimedia content presented via the channel during that time duration, where the time duration includes the time of the interaction. In some embodiments, each channel from the group of channels is associated with a time stream of multimedia content presented via that channel. Such a time stream is divided into a number of predefined, mutually-exclusive time durations, each of which is associated with a single piece of multimedia content. In other words, one and only one piece of multimedia content is presented during each time duration. Thus, each time duration is associated with the identifier of the piece of multimedia content that is presented via the channel during that time duration.

Therefore, the server device locates the time of interaction within the time stream for the determined channel, and then determines, from all the time durations of the time stream, a time duration that includes the time of interaction. Accordingly, the server device determines the identifier of the multimedia content presented via the channel during the determined time duration. Presumably, the multimedia content presented via the channel during the determined time duration is the same multimedia content as the piece of multimedia content whose data is received from the client device at S401.

At S405, the server device retrieves, based on the determined identifier, interactive content associated with the multimedia content presented via the channel during the time duration. In some embodiments, interactive content associated with the multimedia content presented via the group of channels is stored in a predefined database of interactive content, where each piece of multimedia content that is potentially presented via a channel from the group of channels is associated with one or more pieces of interactive content. As described above with respect to FIG. 2, the interactive content can include, for example, an interactive webpage configured to promote or advertise a product or service associated with the corresponding piece of multimedia content (e.g., an advertisement). In such embodiments, the server device can retrieve the interactive content associated with the piece of multimedia content using the identifier of the piece of multimedia content. The server device can then send the interactive content to the client device.

Figure 5:
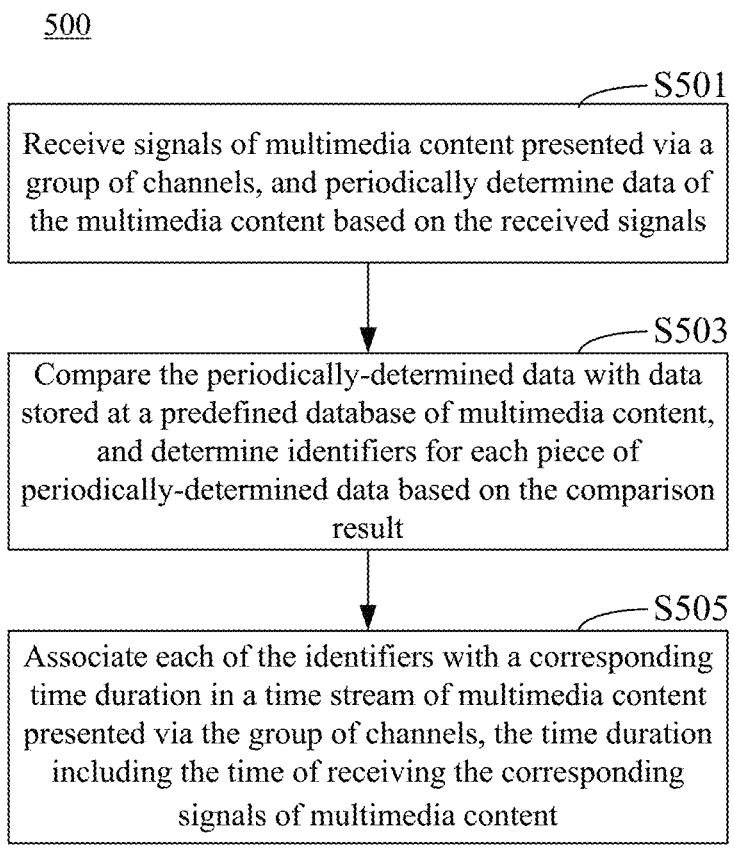
FIG. 5 is a flowchart illustrating a method performed at a server device for determining identifiers for time durations in time streams of multimedia content presented via a group of channels in accordance with some embodiments.

FIG. 5 is a flowchart illustrating a method 500 performed at a server device for determining identifiers for time durations in time streams of multimedia content presented via a group of channels in accordance with some embodiments. The server device performing the method 500 is similar to the server device 70 shown and described above with respect to FIG. 1. Particularly, the server device is operatively coupled to and communicates with one or more client devices that are similar to the client device 50 shown and described above with respect to FIG. 1. A client device operatively coupled to and communicating with the server device is operated by a user (e.g., the user 55 in FIG. 1), who receives multimedia content presented by a terminal device (e.g., the terminal device 30 in FIG. 1). Related to operations of S430 in performing the method 400 shown and described above with respect to FIG. 4, the server device performs operations of the method 500 to associate each time duration in the time stream with an identifier of a piece of multimedia content.

In some embodiments, the server device performing the method 500 can include one or more processors and memory. In such embodiments, the method 500 can be implemented using instructions or code of an application stored in a non-transitory computer readable storage medium of the server device and executed by the one or more processors of the server device. The application is associated with enabling a user to interact with multimedia content presented by a terminal device. Such an application typically has a client-side portion that is stored in and/or executed at each client device operatively coupled to the server device, and a server-side portion that is stored in and/or executed at the server device. As a result of the server-side portion of the application being executed, the method 500 is performed at the server device. As shown in FIG. 5, the method 500 includes the following steps.

At S501, the server device receives signals of multimedia content presented via a group of channels. In some embodiments, for example, the multimedia content is TV programs and/or TV advertisements that are presented to users via TVs (as terminal devices). In such embodiments, the server device can implement, for example, a digital satellite receiver apparatus to receive satellite signals of the multimedia content that are transmitted from a TV satellite. After receiving the satellite signals, the server device processes the satellite signals to retrieve audio signals of the multimedia content. Then, the server device periodically determines data of the multimedia content based on the received audio signals. In some embodiments, the data of the multimedia content includes audio fingerprints of the multimedia content. In such embodiments, the server device can perform the operations in S215 of the method 300 described above with respect to FIG. 3 to extract the audio fingerprints of the multimedia content from the audio signals.

At S503, the server device compares the periodically-determined data with data stored at a predefined database of multimedia content. The server device then determines an identifier for each piece of periodically-determined data based on the comparison result. At S505, the server device associates each of the identifiers with a corresponding time duration in a time stream of multimedia content presented via a channel from the group of channels, where the time duration includes the time of receiving the corresponding signals of the multimedia content or the corresponding time of interaction.

In some embodiments, the predefined database of multimedia content stores data associated with multiple pieces of multimedia content that are presented via the group of channels. Such data can be, for example, audio fingerprints for the multiple pieces of multimedia content. In some embodiments, the data associated with the multimedia content can be provided by the producer or provider of the multimedia content prior to the server device receiving signals of the multimedia content at S501.

In some embodiments, each piece of multimedia content (whose data is stored in the predefined database of multimedia content) is associated with an identifier. The server device compares the data (e.g., an audio fingerprint) of a piece of multimedia content (whose audio signals are received and processed at S501 to extract the data of that piece of multimedia content) with the data of the multiple pieces of multimedia content that is stored in the predefined database of multimedia content. As a result of the comparison, the server device determines, from the multiple pieces of multimedia content, a piece of multimedia content whose data is stored in the predefined database and matches the data of the received piece of multimedia content. The server device then determines the identifier of the received piece of multimedia content.

In such a method, the server device determines an identifier for the periodically-determined data of each piece of multimedia content, whose signals are received at the server device. Thus, the server device establishes a time stream for each channel from the group of channels, where each time stream includes multiple mutually-exclusive time durations. Each time duration included in a time stream for a channel is associated with an identifier identifying a piece of multimedia content that is presented via the channel during that time duration. In other words, the server device determines an identifier of multimedia content for each time duration included in a time stream associated with the multimedia content presented via each channel from the group of channels. Additionally, each time duration included in a time stream for a channel covers the time of receiving the signals of the corresponding piece of multimedia content.

In some embodiments, the predefined database of multimedia content does not include information (e.g., audio fingerprints, identifiers) of every piece of multimedia content that can potentially be presented via the group of channels. In such embodiments, the resulted time stream for a channel does not necessarily provide a continuous, non-broken coverage of a long period of time. Specifically, such a time stream covers time durations when a piece of multimedia content, whose information is included in the predefined database, is presented via the channel. And, the time stream does not cover time durations when a piece of multimedia content, whose information is not included in the predefined database, is presented via the channel.

For example, a predefined database only includes information (e.g., audio fingerprints, identifiers) of TV advertisements, but does not include information of any other type of TV programs (e.g., episodes, news, sports, etc.). Thus, the server device can only determine TV advertisements, but not other type of TV programs, using the predefined database. As a result, the resulted time stream for a TV channel includes time durations when TV advertisements are presented via that TV channel, but does not include any time duration when other type of TV programs are presented via that TV channel.

As an example of performing the method 500, the predefined database stores audio fingerprints for each TV advertisement from a group of TV advertisements that can be potentially presented via a group of TV channels. Those audio fingerprints are provided by the producer(s) or distributor(s) of the TV advertisements. Alternatively, the TV advertisements are provided to the server device (or an operator or entity that owns and operates the server device) by the producer(s) or distributor(s), and the server device (or the operator or entity) then processes the received TV advertisements to obtain the audio fingerprint for each TV advertisement. Additionally, each TV advertisement from the group of TV advertisements is identified by an identifier, which is also stored in the predefined database and associated with the audio fingerprint of the corresponding TV advertisement.

The server device constantly monitors and receives satellite TV signals (e.g., from a TV satellite) targeted to be broadcast via the group of TV channels, and then periodically extracts audio fingerprints from the audio signals of the received satellite TV signals. In some embodiments, the server device can periodically capture audio signals targeted to be broadcast via each TV channel from the group of TV channels, and then can extract an audio fingerprint from the audio signals captured at each periodic cycle for each TV channel. Alternatively, the server device can keep receiving satellite TV signals for the group of TV channels. The server device can then extract audio fingerprints for each TV channel from the received satellite TV signals of that TV channel according to a periodic schedule that corresponds to a unit time duration (e.g., every minute, every 30 seconds, every 15 seconds, etc.). Such a unit time duration can be defined based on the minimum time duration of a TV advertisement such that the server device does not miss any TV advertisement broadcast via any TV channel from the group of TV channels.

Every time the server device extracts an audio fingerprint of a piece of multimedia content (e.g., a TV program, a TV advertisement, a TV episode, etc.) broadcast via a TV channel from the group of TV channels, the server device compares the audio fingerprint with the audio fingerprints stored in a predefined database of audio fingerprints for TV advertisements. The predefined database of audio fingerprints for TV advertisements stores an identifier and an audio fingerprint of each TV advertisement that can potentially be broadcast via a TV channel from the group of TV channels. If the comparison result indicates that the audio fingerprint extracted by the server device matches (i.e., is identical to or substantially identical to) an audio fingerprint of a TV advertisement that is stored in the predefined database, the server device determines that the piece of multimedia content is that TV advertisement (or part of that TV advertisement). Accordingly, the server device assigns the identifier of the TV advertisement to be the identifier of the piece of multimedia content.

Consequently, the server device establishes a time stream of TV advertisements for each TV channel from the group of TV channels. Each of such time streams includes multiple mutually-exclusive (and probably non-adjacent) time durations, during which TV advertisements are broadcast via the corresponding TV channel. Each time duration within such a time stream of a TV channel is associated with an identifier of a TV advertise that is broadcast via that TV channel during that time duration (or roughly during that time duration if delays caused by transmission and processing are considered). Additionally, each time duration within such a time stream of a TV channel covers the time of the server device receiving the corresponding signals of multimedia content associated with the TV advertisement that is broadcast via that TV channel during that time duration.

Figure 6:
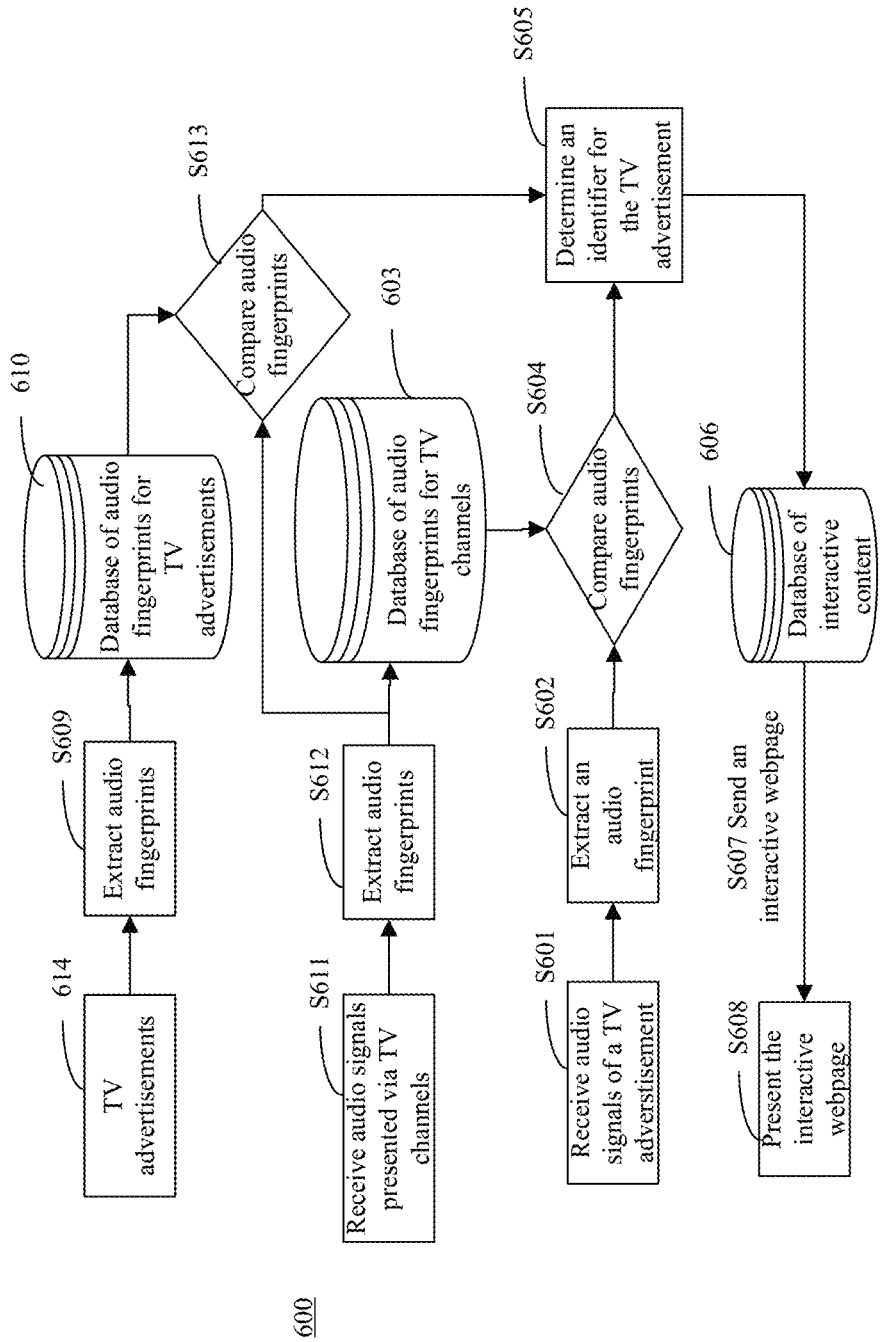
FIG. 6 is a schematic diagram illustrating a process of enabling a user to interact with a TV advertisement in accordance with some embodiments.

FIG. 6 is a schematic diagram illustrating a process 600 of enabling a user to interact with a TV advertisement in accordance with some embodiments. For example, the user uses a terminal device (e.g., the terminal device 30 in FIG. 1 such as a TV) to receive TV signals (e.g., satellite TV signals) and to present TV content to the user. The user also uses a client device (e.g., the client device 50 in FIG. 1 such as a smart phone or a smart controller) to enable the user to interact with TV content. The client device is operatively coupled to and communicates with a server device (e.g., the server device 70 in FIG. 1).

When the user watches a TV advertisement with which she intends to interact, the user operates the client device to generate an interaction instruction. At S601, the client device receives audio signals of the TV advertisement in response to the interaction instruction. For example, the client device can receive audio signals by recording audio from the TV advertisement. At S602, the client device extracts an audio fingerprint from the received audio signals of the TV advertisement. For example, the client device can extract the audio fingerprint by performing the operations of S215 of the method 300 shown and described above with respect to FIG. 3. Subsequently, the client device sends the extracted audio fingerprint of the TV advertisement to the server device.

The server device can access a database of audio fingerprints for TV channels 603, which stores information (e.g., audio fingerprints, TV channels) for TV advertisements broadcast via the TV channels. In some embodiments, as described below with respect to S611-S612, the database 603 is regularly and/or periodically updated. In such embodiments, the database 603 is configured to store information (e.g., audio fingerprints, TV channels) of TV advertisements that are currently or most recently broadcast at each TV channel from the group of TV channels. As a result, when the user initiates an interaction process in response to watching a TV advertisement via a TV channel, information (e.g., an audio fingerprint, a TV channel) of that TV advertisement is stored in the database 603.

In response to receiving the extracted audio fingerprint of the TV advertisement from the client device, at S604, the server device compares the extracted audio fingerprint with audio fingerprints stored in the database 603. As a result of the comparison, the server device determines an audio fingerprint stored in the database 603 that matches (e.g., is identical to or substantially identical to) the extracted audio fingerprint received from the client device. Thus, the server device determines the TV channel via which the TV advertisement is broadcast. Specifically, the server device determines that the TV channel associated with the matching audio fingerprint stored in the database 603 is the TV channel via which the TV advertisement watched by the user is broadcast.

In some embodiments, the server device can determine a time of interaction based on the matching of audio fingerprints. Specifically, the server device can determine that the time of interaction falls within the time duration when the TV advertisement associated with the matching audio fingerprint stored in the database 603 is broadcast. In such embodiments, the time duration (e.g., including a beginning time and an ending time) of a TV advertisement can be stored in the database 603 and associated with other information (e.g., an audio fingerprint, a TV channel) of that TV advertisement in the database 603.

Alternatively, in some other embodiments, the server device can determine the time of interaction based on the data of the TV advertisement watched by the user that is received from the client device. Specifically, the client device can send the time of receiving the audio signals of the TV advertisement (at S601) together with other information (e.g., the extracted audio fingerprint of that TV advertisement) to the server device. In such embodiments, the server device can use the time of receiving the audio signals of the TV advertisement watched by the user as the time of interaction.

Presumably, if the server device determines a matching between the extracted audio fingerprint received from the client device and an audio fingerprint stored in the database 603, it indicates that the TV advertisement watched by the user is the TV advertisement associated with that audio fingerprint stored in the database 603. As such, the time of receiving the audio signals of the TV advertisement watched by the user is typically within the time duration when the TV advertisement determined by the comparison at S604 is broadcast via TV. In other words, the above two approaches for determining a time of interaction can generate the same (or substantially the same) time of interaction for the same TV advertisement watched by the user.

Additionally, in some embodiments, the server device can determine more than one audio fingerprint stored in the database 603 that match the extracted audio fingerprint received from the client device, which indicates the TV advertisement watched by the user is broadcast via more than one TV channel at the same time (or at substantially the same time, or at overlapping times). In such embodiments, the server device can select one TV channel from the more than one TV channel using any arbitrary method, and assume that the user watches the TV advertisement via the selected TV channel.

After the user determines the time of interaction and the TV channel via which the TV advertisement watched by the user is broadcast at the time of interaction, at S605, the server device determines an identifier for the TV advertisement watched by the user. As a result of the procedure leading to S613 as described below, the server device determines a time stream of TV advertisements for each TV channel from the group of TV channels. Each time stream for a TV channel includes multiple mutually-exclusive time durations, each of which corresponds to the time of a TV advertisement being broadcast via that TV channel. Moreover, each time duration is associated with the identifier of the TV advertisement that is broadcast in that time duration. In other words, operations of S613 generate a time stream of identifiers for each TV channel.

Based on the time of interaction (determined at S604), the TV channel (determined at S604), and the set of time streams of identifiers for the group of TV channels (determined at S613), the server device determines the identifier for the TV advertisement watched by the user at S605. Specifically, the server device identifies, from the set of time streams of identifiers for the group of TV channels, the time stream of identifiers for the TV channel via which the TV advertisement watched by the user is broadcast. The server device then determines the time duration in the time stream that includes the time of interaction. Finally, the server device determines that the identifier associated with that time duration is the desired identifier for the TV advertisement watched by the user.

Next, the server device searches interactive content in a database of interactive content 606 using the identifier determined at S605. Interactive content associated with a piece of multimedia content (e.g., a TV advertisement) stored in the database 606 can be identified and/or indexed by, for example, an identifier of that piece of multimedia content. The server device then retrieves, based on the identifier of the TV advertisement and from the database 606, an interactive webpage associated with the TV advertisement. At S607, the server device sends the retrieved interactive webpage to the client device. At S608, in response to receiving the interactive webpage, the client device displays the interactive webpage to the user. Thus, the user is prompted by the interactive webpage to interact with the TV advertisement.

Alternatively, in some embodiments, the server device or the client device is configured to cause the interactive webpage to be displayed at another display device to the user. For example, the server device sends the interactive webpage to the terminal device (e.g., a smart TV), via which the user watches the TV programs including the TV advertisements. The terminal device then interrupts the broadcast of TV programs and presents the interactive webpage to the user. Subsequently, the user can use the client device (e.g., a controller of a smart TV) to interact with the interactive webpage, or cancel the presentation of the interactive webpage to continue the broadcast of TV programs.

In a separate process, the server device is configured to identify TV advertisements broadcast in the group of TV channels and associate each identified TV advertisement with its identifier. Specifically, one or more producers, distributors and/or providers of TV advertisements provide TV advertisements 615 to the server device. At S609, the server device extracts an audio fingerprint from the audio of each provided TV advertisement. For example, the server device can perform the operations in S215 of the method 300 described above with respect to FIG. 3 to extract the audio fingerprints of the provided TV advertisements 614.

The server device then stores the extracted audio fingerprints of the provided TV advertisements 614 in a database of audio fingerprints for TV advertisements 610. Furthermore, the audio fingerprint for each TV advertisement is stored and associated with the identifier of that TV advertisement in the database 610. Thus, the database 610 stores at least an audio fingerprint and an identifier of each TV advertisement that is broadcast in the group of TV channels. In some embodiments, the TV advertisements 614 are provided to the server device and the database 610 is established prior to the TV advertisements 614 being broadcast via the group of TV channels. As such, the database 610 is predefined and available before TV advertisements are broadcast and/or a user initiates an interaction process.

At S611, the server device receives audio signals of TV content broadcast via the group of TV channels. In some embodiments, the server device is configured to receive audio signals according to a preset schedule such that the server device is scheduled to receive audio signals of TV advertisements, but not other TV programs. In such embodiments, the schedule for receiving audio signals for each TV channel can be preset based on a predefined time line of TV programs to be broadcast on that TV channel. Alternatively, in other embodiments, the server device can receive audio signals of TV content broadcast via the group of TV channels, and then identify and select audio signals of TV advertisements from audio signals of other TV programs.

At S612, the server device extracts audio fingerprints from the received audio signals of the TV advertisements broadcast via the group of TV channels. In some embodiments, the server device can periodically extract audio fingerprints from the received audio signals. For example, the server device receives audio signals associated with a first TV advertisement that is broadcast during a first time duration that lasts 10 minutes via a TV channel, and a second TV advertisement that is broadcast during a second time duration that lasts 8 minutes via the same TV channel. The first time duration is not overlapping or adjacent to the second time duration. The server device then extracts an audio fingerprint every two minute in the first time duration and the second time duration, and each audio fingerprint is extracted from audio signals that correspond to a short time period of 30 seconds. That is, the server device extracts a first audio fingerprint based on audio signals corresponding to the first 30 seconds of the first two-minute period in the first time duration (i.e., the first and second minutes in the 10-minute time duration); the server device extracts a second audio fingerprint based on audio signals corresponding to the first 30 seconds of the second two-minute period in the first time duration (i.e., the third and fourth minutes in the 10-minute time duration); so on and so forth until the server device extracts a fifth audio fingerprint based on audio signals corresponding to the first 30 seconds of the fifth two-minute period in the first time duration (i.e., the ninth and tenth minutes in the 10-minute time duration). Similarly, the server device extracts four audio fingerprints from the audio signals corresponding to the second time duration (because the second time duration includes four two-minute periods). In other embodiments, the server device can extract audio fingerprints based on received audio signals of TV advertisements using any other suitable method.

The server device then stores the extracted audio fingerprints in the database 603. The audio fingerprints stored in the database 603 can be used to be compared with the audio fingerprint extracted from the audio signals of the TV advertisement watched by the user, as described above with respect to S604. In some embodiments, audio fingerprints associated with TV advertisements broadcast in a TV channel that are stored in the database 603 can be periodically updated. As a result, at any given time, audio fingerprints associated with the TV advertisement(s) that is currently broadcast or most recently broadcast via the TV channel are stored in the database 603, while audio fingerprints associated with outdated TV advertisements broadcast via the TV channel are removed from the database 603. For example, the database 603 can be configured to store only audio fingerprints of TV advertisements that have been broadcast via the group of TV channels in the last 10 minutes. For another example, the database 603 can be configured to store up to only ten most recent audio fingerprints of TV advertisements that have been broadcast via each TV channel from the group of TV channels. In such a method, the database 603 can store audio fingerprints of TV advertisements that are most recently broadcast without a need to constantly expand the storage of the database 603.

At S613, the server device compares audio fingerprints associated with the TV advertisements broadcast via the group of TV channels with audio fingerprints stored in the database 610. As a result of the comparison, the server device identifies an identifier of TV advertisement for each audio fingerprint extracted at S612. To be specific, when the server device determines a match between an audio fingerprint extracted at S612 and an audio fingerprint stored in the database 610, the server device infers that the TV advertisement associated with the audio fingerprint stored in the database 610 is broadcast at a time corresponding to the audio fingerprint extracted at S612, at the TV channel associated with the audio fingerprint extracted at S612.

Based on the audio fingerprints extracted at S612 that are distributed in a time stream for a TV channel, the server device generates a time stream for that TV channel. Specifically, the time stream for a TV channel includes multiple mutually-exclusive time durations, each of which corresponds to the time of a TV advertisement being broadcast via that TV channel. Furthermore, based on the comparison result from S613, the server device determines an identifier of TV advertisement for each audio fingerprint extracted at S612. By incorporating the determined identifiers for the audio fingerprints of TV advertisements broadcast via a TV channel into the time stream of that TV channel, the server device generates a time stream of identifiers for that TV channel. As described above, such a time stream of identifiers for a TV channel includes multiple mutually-exclusive time durations, each of which corresponds to the time of a TV advertisement being broadcast via that TV channel. Each time duration included in the time stream of identifiers for a TV channel is associated with or identified by an identifier of a TV advertisement that is broadcast during that time duration via that TV channel. Such time streams of identifiers for each TV channel from the group of channels are then used to determine the identifier for a TV advertisement watched by the user, as described above with respect to S605.

Figure 7:
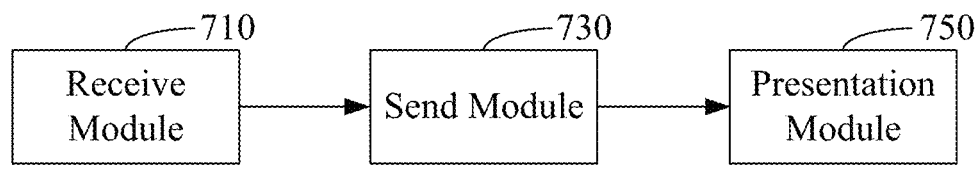
FIG. 7 is a block diagram illustrating structure of a client device in accordance with some embodiments.

FIG. 7 is a block diagram illustrating structure of a client device 700 in accordance with some embodiments. The client device 700 can be structurally and functionally similar to the client device 50 shown and described above with respect to FIG. 1. Particularly, the client device 700 can be operatively coupled to and communicate with a server device (e.g., the server device 70 in FIG. 1). Furthermore, the client device 700 can be operated by a user (e.g., the user 55 in FIG. 1) who receives multimedia content via a terminal device (e.g., the terminal device 30 in FIG. 1).

As shown in FIG. 7, the client device 700 includes a receive module 710, a send module 730 and a presentation module 750. In some embodiments, a client device can include more or less modules than those shown in FIG. 7. In some embodiments, each module included in the client device 700 can be a hardware-based module (e.g., a digital signal processor (DSP), a field programmable gate array (FPGA), an application-specific integrated circuit (ASIC), etc.), a software-based module (e.g., a module of computer code executed at a processor, a set of processor-readable instructions executed at a processor, etc.), or a combination of hardware and software modules. Instructions or code of each module can be stored in a memory of the client device 700 (not shown in FIG. 7) and executed at a processor (e.g., a CPU) of the client device 700 (not shown in FIG. 7).

Overall, the receive module 710, the send module 730 and the presentation module 750 can be configured to collectively perform the methods 200, 300 and the client-portion of the process 600 shown and described above with respect to FIGS. 2, 3 and 6.

The receive module 710 is configured to, among other functions, receive interaction instructions from the user of the client device 700. The receive module 710 is also configured to capture or extract, in response to receiving an interaction instruction, data associated with multimedia content presented to the user via the terminal device. As described herein, for example, the multimedia content can be video content or audio content. The data associated with the multimedia content can include, for example, audio data or video data. In some embodiments, for example, the receive module 710 can be configured to capture audio signals of the multimedia content and then extract an audio fingerprint from the captured audio signals of the multimedia content.

In some embodiments, the receive module 710 is configured to perform the operations of S210 in the method 200 and the operations of the method 300 shown and described above with respect to FIGS. 2-3. Specifically, the receive module 700 can receive, from the user of the client device 700, an interaction instruction associated with a piece of multimedia content currently being presented to the user via the terminal device (e.g., a TV advertisement broadcast via a TV channel at a TV). The receive module 700 can then initiate recording audio of the piece of multimedia content in response to the interaction instruction. Finally, the receive module 700 can extract, from the recorded audio of the piece of multimedia content, an audio fingerprint of the piece of multimedia content.

The send module 730 is configured to, among other functions, send the data associated with multimedia content and determined at the receive module 710 to the server device, such that the server device determines, based on the data, identifier(s) of the multimedia content. In some embodiments, for example, the data can include audio fingerprint(s) of the multimedia content. In some embodiments, the send module 730 is configured to perform the operations of S230 in the method 200 shown and described above with respect to FIG. 2.

The presentation module 750 is configured to, among other functions, receive, from the server device and in response to the send module 730 sending the data, interactive content associated with the multimedia content. The presentation module 750 is also configured to present the interactive content to the user of the client device 700. In some embodiments, for example, the interactive content can include an interactive webpage that is configured to prompt the user to purchase a product or a service associated with the multimedia content. In some embodiments, the presentation module 750 is configured to perform the operations of S250 in the method 200 shown and described above with respect to FIG. 2.

Figure 8:
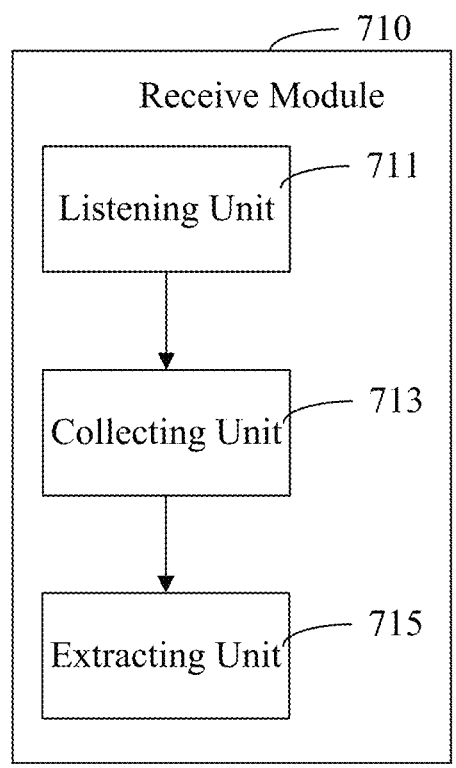
FIG. 8 is a block diagram illustrating structure of a receive module within the client device in FIG. 7.

FIG. 8 is a block diagram illustrating structure of the receive module 710 within the client device 700 in FIG. 7. As shown in FIG. 8, the receive module 710 includes a listening unit 711, a collecting unit 713 and an extracting unit 715. In some embodiments, a receive module in a client device can include more or less sub-modules or units than those shown in FIG. 8. In some embodiments, each module (e.g., submodule, unit) included in the receive module 710 can be a hardware-based module (e.g., a DSP, a FPGA, an ASIC, etc.), a software-based module (e.g., a module of computer code executed at a processor, a set of processor-readable instructions executed at a processor, etc.), or a combination of hardware and software modules. Instructions or code of each module can be stored in a memory of the client device 700 (not shown in FIG. 8) and executed at a processor (e.g., a CPU) of the client device 700 (not shown in FIG. 8). Overall, the listening unit 711, the collecting unit 713 and the extracting unit 715 can be configured to collectively perform operations of S250 of the method 200 and operations of the method 300 shown and described above with respect to FIGS. 2-3.

Specifically, the listening unit 711 is configured to receive, from the user of the client device 700, interaction instructions associated with multimedia content that is presented to the user via the terminal device. In other words, the listening unit 711 can be configured to perform the operations of S211 of the method 300 in FIG. 3.

The collecting unit 713 is configured to collect data associated with the multimedia content in response to the listening unit 711 receiving an interaction instruction from the user. In some embodiments, for example, the collecting unit 713 can initiate recording audio of the multimedia content in response to the listening unit 711 receiving an interaction instruction. In other words, the collecting unit 713 can be configured to perform the operations of S213 of the method 300 in FIG. 3.

The extracting unit 715 is configured to extract audio fingerprints from the data associated with the multimedia content that is collected by the collecting unit 713. In some embodiments, for example, the extracting unit 715 can extract audio fingerprints from the audio of the multimedia content recorded by the collecting unit 713. In other words, the extracting unit 715 can be configured to perform the operations of S215 of the method 300 in FIG. 3. In some embodiments, for example, the extracting unit 715 can perform the sever-step operations to extract an audio fingerprint from recorded audio data as described above with respect to S215 in FIG. 3.

Figure 9:
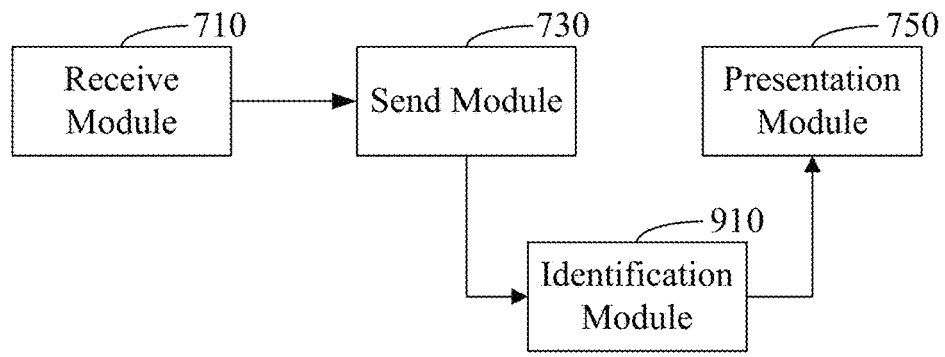
FIG. 9 is a block diagram illustrating structure of a system consisting of modules within a client device and a server device in accordance with some embodiments.

FIG. 9 is a block diagram illustrating structure of a system 900 consisting of modules within the client device 700 and a server device in accordance with some embodiments. The server device can be structurally and functionally similar to the server device 70 shown and described above with respect to FIG. 1. The server device is operatively coupled to and communicates with the client device 700. As shown in FIG. 9, the server device includes an identification module 910. In some embodiments, a server device can include more modules than that shown in FIG. 9.

In some embodiments, similar to the modules of the client device 700, each module of the server device included in the system 900 can be a hardware-based module (e.g., a DSP, a FPGA, an ASIC, etc.), a software-based module (e.g., a module of computer code executed at a processor, a set of processor-readable instructions executed at a processor, etc.), or a combination of hardware and software modules. Instructions or code of each module can be stored in a memory of the server device (not shown in FIG. 9) and executed at a processor (e.g., a CPU) of the server device (not shown in FIG. 9).

The identification module 910 is configured to, among other functions, identify, retrieve and send interactive content associated with multimedia content in response to receiving data associated with the multimedia content from the client device 700. In other words, the identification module 910 can be configured to perform the operations of the method 400 in FIG. 4. Specifically, for example, the send module 730 of the client device 700 sends data associated with a piece of multimedia content to the identification module 910 of the server device. Based on the data associated with the piece of multimedia content, the identification module 910 determines an identifier for the piece of multimedia content, and then identifies interactive content associated with the piece of multimedia content based on the determined identifier of the piece of multimedia content. The identification module 910 retrieves and sends the interactive content to the presentation module 750 of the client device 700. In some embodiments, for example, the piece of multimedia content can be an advertisement; the data associated with the piece of multimedia content can include an audio fingerprint of the advertisement; and the interactive content can include an interactive webpage for purchasing a product or service associated with the advertisement.

Figure 10:
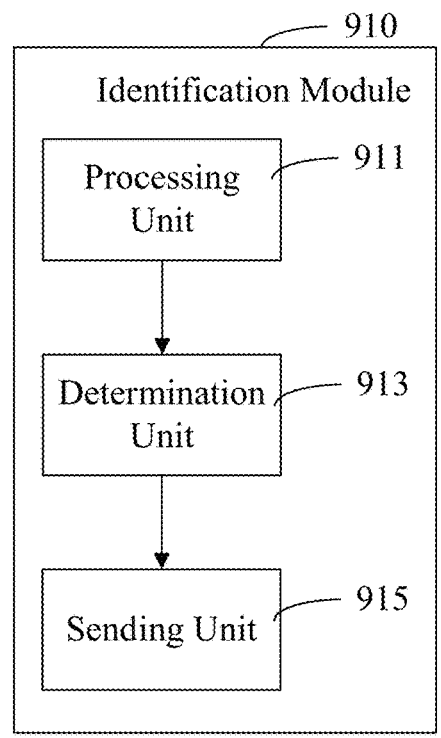
FIG. 10 is a block diagram illustrating structure of an identification module within the system in FIG. 9.

FIG. 10 is a block diagram illustrating structure of the identification module 910 within the system 900 in FIG. 9. As shown in FIG. 10, the identification module 910 includes a processing unit 911, a determination unit 913 and a sending unit 915. In some embodiments, an identification module in a server device can include more or less sub-modules or units than those shown in FIG. 10. In some embodiments, each module (e.g., submodule, unit) included in the identification module 910 can be a hardware-based module (e.g., a DSP, a FPGA, an ASIC, etc.), a software-based module (e.g., a module of computer code executed at a processor, a set of processor-readable instructions executed at a processor, etc.), or a combination of hardware and software modules. Instructions or code of each module can be stored in a memory of the server device (not shown in FIG. 10) and executed at a processor (e.g., a CPU) of the server device (not shown in FIG. 10). Overall, the processing unit 911, the determination unit 913 and the sending unit 915 can be configured to collectively perform operations of the method 400 shown and described above with respect to FIG. 4.

The processing unit 911 is configured to receive data associated with multimedia content from the client device 700 (e.g., the send module 730 of the client device 700). The processing unit 911 is also configured to process the received data to determine a channel via which the multimedia content is presented to the user, as well as a time of interaction. In other words, the processing unit 911 can be configured to perform the operations of S401 of the method 400 in FIG. 4.

In some embodiments, the data associated with a piece of multimedia content includes an audio fingerprint of that piece of multimedia content. In such embodiments, the processing unit 911 can compare the received audio fingerprint of the piece of multimedia content with audio fingerprints stored in a database of audio fingerprints for multimedia content presented via a group of channels (e.g., the database of audio fingerprints for TV channels 603 in FIG. 6) to determine the channel via which the piece of multimedia content is presented. Additionally, as a result of the comparison, the processing unit 911 can determine the time of interaction. In some embodiments, for example, the processing unit 911 can perform the four-step process to compare a received audio fingerprint with audio fingerprints stored in the database as described above with respect to S401 in FIG. 4.

The determination unit 913 is configured to determine an identifier of the received multimedia content based on the channel and the time of interaction associated with the received multimedia content that are determined by the processing unit 911. In other words, the determination unit 913 can be configured to perform the operations of S403 of the method 400 in FIG. 4. Specifically, after the processing unit 911 determines the channel and time of interaction associated with a received piece of multimedia content, the determination unit 913 can locate the time of interaction in a time stream of identifiers for the channel. As described above with respect to FIGS. 4 and 6, such a time stream of identifiers for a channel includes multiple mutually-exclusive time durations, each of which is associated with an identifier of a piece of multimedia content that is presented via that channel during that time duration. Thus, the determination unit 913 can determine the identifier of the piece of multimedia content.

The sending unit 915 is configured to retrieve, based on the identifier of multimedia content determined by the determination unit 913, interactive content associated with the multimedia content. In some embodiments, the interactive content includes, for example, an interactive webpage associated with the multimedia content. The sending unit 915 is also configured to send the retrieved interactive content to the client device 700 (e.g., the presentation module 750 of the client device 700). In other words, the sending unit 915 can be configured to perform the operations of S405 of the method 400 in FIG. 4.

Figure 11:
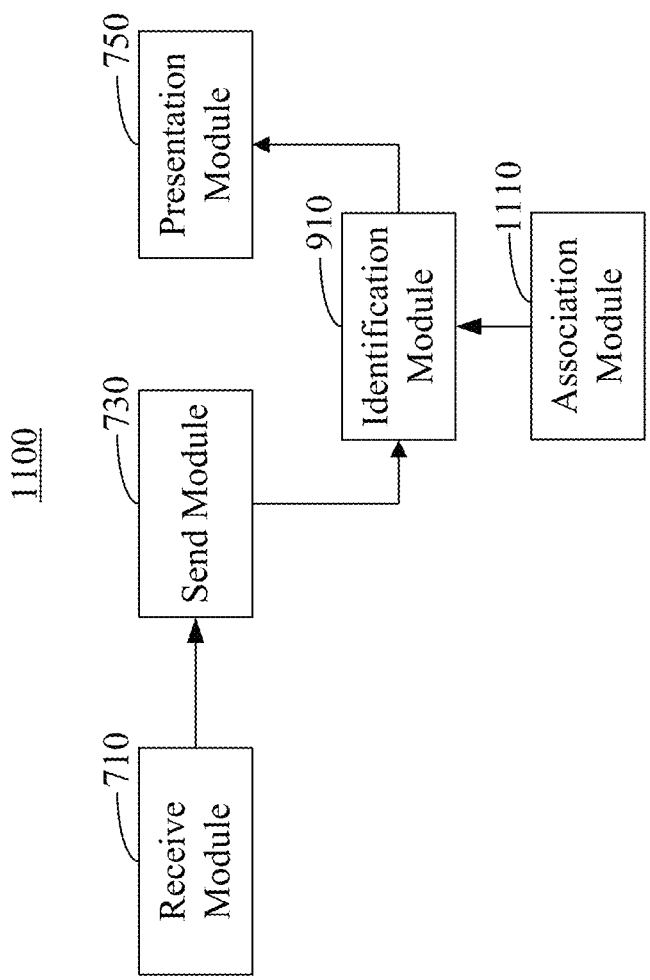
FIG. 11 is a block diagram illustrating structure of another system consisting of modules within a client device and a server device in accordance with some embodiments.

FIG. 11 is a block diagram illustrating structure of another system 1100 consisting of modules within the client device 700 and a server device in accordance with some embodiments. The system 1100 is similar to the system 900 shown and described above with FIG. 9. Particularly, the server device included in the system 1100 is structurally and functionally similar to the server device included in the system 900 in FIG. 9. As shown in FIG. 11, the server device includes the identification module 910 and an association module 1110.

The association module 1110 is configured to, among other functions, determine and associate identifiers for time durations in time streams of multimedia content presented via a group of channels. In other words, the association module 1110 can be configured to perform the operations of the method 500 in FIG. 5. Specifically, for example, the association module 1110 can receive signals of multimedia content presented via the group of channels. The association module 1110 can periodically determine data of the multimedia content based on the received signals. In some embodiments, the received signals are audio signals and the data determined by the association module 1110 includes audio fingerprints for the multimedia content. The association module 1110 can compare the periodically-determined data with data stored at a predefined database of multimedia content to determine an identifier for each piece of the periodically-determined data. Finally, the association module 1110 can associate each of the identifiers with a corresponding time duration in a time stream of multimedia content presented via a channel from the group of channels, where the time duration includes the time of receiving the corresponding signals of the multimedia content or the corresponding time of interaction.

Figure 12:
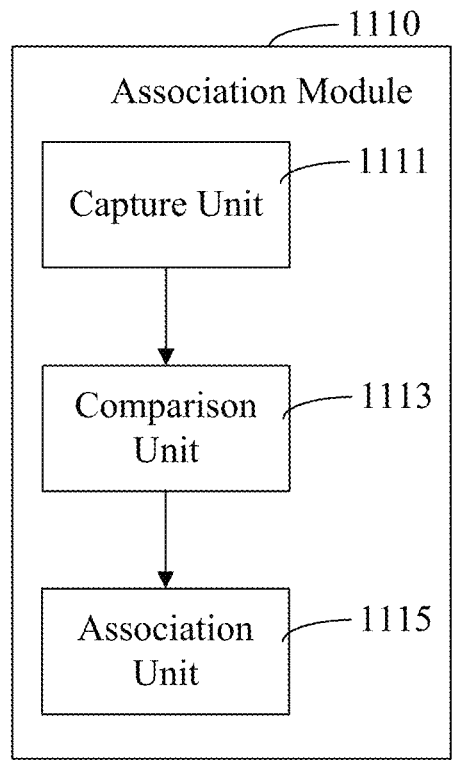
FIG. 12 is a block diagram illustrating structure of an association module within the system in FIG. 11.

FIG. 12 is a block diagram illustrating structure of the association module 1110 within the system 1100 in FIG. 11. As shown in FIG. 12, the association module 1110 includes a capture unit 1111, a comparison unit 1113 and an association unit 1115. In some embodiments, an association module in a server device can include more or less sub-modules or units than those shown in FIG. 12. In some embodiments, each module (e.g., submodule, unit) included in the association module 1110 can be a hardware-based module (e.g., a DSP, a FPGA, an ASIC, etc.), a software-based module (e.g., a module of computer code executed at a processor, a set of processor-readable instructions executed at a processor, etc.), or a combination of hardware and software modules. Instructions or code of each module can be stored in a memory of the server device (not shown in FIG. 12) and executed at a processor (e.g., a CPU) of the server device (not shown in FIG. 12). Overall, the capture unit 1111, the comparison unit 1113 and the association unit 1115 can be configured to collectively perform operations of the method 500 shown and described above with respect to FIG. 5.

The capture unit 1111 is configured to receive signals of multimedia content presented via a group of channels, and periodically determine data of the multimedia content based on the received signals. In other words, the capture unit 1111 can be configured to perform the operations of S501 of the method 500 in FIG. 5. In some embodiments, for example, the signals of the multimedia content are audio signals and the determined data includes audio fingerprint(s) of the multimedia content. In such embodiments, the capture unit 1111 can perform the operations in S215 of the method 300 described above with respect to FIG. 3 to extract the audio fingerprints of the multimedia content from the audio signals.

The comparison unit 1113 is configured to compare the periodically-determined data with data stored at a predefined database of multimedia content (e.g., the database of audio fingerprints for TV advertisements 610 in FIG. 6). The comparison unit 1113 can determine an identifier for each piece of periodically-determined data based on the comparison result. In other words, the comparison unit 1113 can be configured to perform the operations of S503 of the method 500 in FIG. 5.

The association unit 1115 is configured to associate each of the identifiers with a corresponding time duration in a time stream of multimedia content presented via a channel from the group of channels, where the time duration includes the time of receiving the corresponding signals of the multimedia content or the corresponding time of interaction. In other words, the association unit 1115 can be configured to perform the operations of S505 of the method 500 in FIG. 5.

Figure 13:
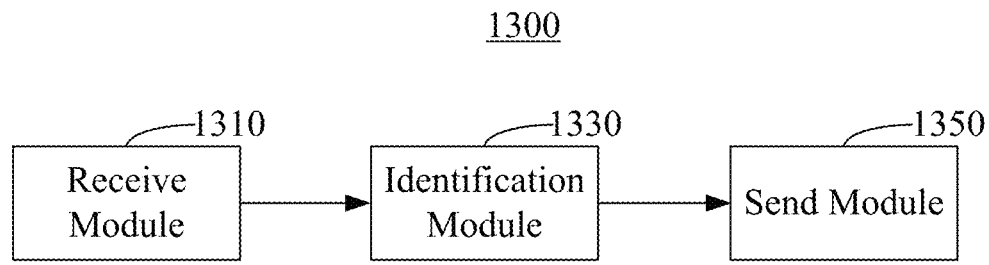
FIG. 13 is a block diagram illustrating structure of a server device in accordance with some embodiments.

FIG. 13 is a block diagram illustrating structure of a server device 1300 in accordance with some embodiments. The server device 1300 can be structurally and functionally similar to the server device 70 shown and described above with respect to FIG. 1. Particularly, the server device 1300 can be operatively coupled to and communicate with a client device (e.g., the client device 50 in FIG. 1) that is operated by a user (e.g., the user 55 in FIG. 1) who receives multimedia content via a terminal device (e.g., the terminal device 30 in FIG. 1).

As shown in FIG. 13, the server device 1300 includes a receive module 1310, an identification module 1330 and a send module 1350. In some embodiments, a server device can include more or less modules than those shown in FIG. 13. In some embodiments, each module included in the server device 1300 can be a hardware-based module (e.g., a DSP, a FPGA, an ASIC, etc.), a software-based module (e.g., a module of computer code executed at a processor, a set of processor-readable instructions executed at a processor, etc.), or a combination of hardware and software modules. Instructions or code of each module can be stored in a memory of the server device 1300 (not shown in FIG. 13) and executed at a processor (e.g., a CPU) of the server device 1300 (not shown in FIG. 13). Overall, the receive module 1310, the identification module 1330 and the send module 1350 can be configured to collectively perform the methods 400, 500 and the server-portion of the process 600 shown and described above with respect to FIGS. 4-6.

In some embodiments, functionalities of a module included in the server device 1300 correspond to at least a portion of functionalities of a module, a unit or a combination of various modules and/or units of a server device shown and described above with respect to FIGS. 9-12. Specifically, the receive module 1310 is configured to, among other functions, receive data associated with multimedia content from the client device. In some embodiments, functionalities of the receive module 1310 correspond to at least a portion of the functionalities of the processing unit 911 of the identification module 910 in FIGS. 9-10.

The identification module 1330 is configured to, among other functions, determine, based on the data received by the receive module 1310, an identifier of the piece of multimedia content presented to the user. In some embodiments, functionalities of the receive module 1310 correspond to at least a portion of the functionalities of the processing unit 911 and the determination unit 913 of the identification module 910 in FIGS. 9-10. Furthermore, functionalities of the receive module 1310 also correspond to the functionalities of the association module 1110 in FIGS. 11-12.

The send module 1350 is configured to, among other functions, retrieve, based on the identifier of the piece of multimedia content determined by the identification module 1330, interactive content associated with the piece of multimedia content, and send the interactive content to the client device. In some embodiments, functionalities of the send module 1350 correspond to the functionalities of the sending unit 915 of the identification module 910 in FIGS. 9-10.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

What is claimed is:

1. A method of presenting interactive content at a client device having one or more processors and memory, wherein the client device is communicably coupled to a server, comprising:
receiving a user instruction to capture multimedia content broadcast by a content display device that is distinct from the client device;
in response to the user instruction:
recording, in real-time, an audio stream of a piece of the multimedia content broadcast by the content display device;
extracting, from the recorded audio stream, an audio fingerprint of the piece of the multimedia content;
sending the audio fingerprint of the piece of the multimedia content to the server, wherein the server is configured for:
determining, based on the audio fingerprint, an identifier of the piece of multimedia content from a set of identifiers for a plurality of pieces of multimedia content pre-stored at the server, each identifier from the set of identifiers identifying at least one piece of multimedia content from the plurality of pieces of multimedia content, wherein the identifier of the piece of multimedia content is determined using a time stream of identifiers including a plurality of time durations and each one of the time stream of identifiers is associated with an identifier of a piece of multimedia content that is broadcast during a corresponding one of the plurality of time durations, and
retrieving, based on the identifier of the piece of multimedia content, interactive content associated with the piece of multimedia content and pre-stored in a database associated with the server;
receiving, from the server, the interactive content associated with the piece of multimedia content; and
rendering the interactive content to the user of the client device.

2. The method of claim 1, wherein the content display device is a television located adjacent the client device and the multimedia content is a television program broadcast on the television.

3. The method of claim 1, wherein the piece of multimedia content is an advertisement of a product being broadcast by the content display device, and the interactive content is an interactive web page enabling the user of the client device to purchase the product through the web page.

4. The method of claim 1, wherein the server is configured for comparing the audio fingerprint with a set of audio fingerprints associated with the plurality of pieces of multimedia content, each audio fingerprint from the set of audio fingerprint uniquely identifying a respective piece of multimedia content from the plurality of pieces of multimedia content.

5. The method of claim 1, wherein the plurality of pieces of multimedia content are associated with a group of channels, and the server is configured for:
receiving signals of the multimedia content;
periodically determining, based on the received signals, audio fingerprints of the multimedia content; and
storing the audio fingerprints into a real-time audio fingerprint database such that an audio fingerprint associated with the multimedia content presented via each channel from the group of channels that is stored in the real-time audio fingerprint database is periodically updated.

6. The method of claim 5, wherein the client device sends a timestamp of the piece of multimedia content to the server, and the server is configured for:
comparing the audio fingerprint with the audio fingerprints stored in the real-time audio fingerprint database to determine a channel from the group of channels via which the piece of multimedia content is presented; and
determining, based on the channel and the timestamp, the identifier of the piece of multimedia content from a predefined database of multimedia content.

7. The method of claim 6, wherein the predefined database of multimedia content stores an identifier of each piece of multimedia content from the plurality of pieces of multimedia content, and information of at least a channel and a time duration of each piece of multimedia content from the plurality of pieces of multimedia content.

8. A client device for presenting interactive content, comprising:
one or more processors;
memory coupled to the one or more processors; and
one or more programs stored in the memory that, when executed by the one or more processors, cause the client device to perform instructions for:
receiving a user instruction to capture multimedia content broadcast by a content display device that is distinct from the client device;
in response to the user instruction:
recording, in real-time, an audio stream of a piece of the multimedia content broadcast by the content display device;
extracting, from the recorded audio stream, an audio fingerprint of the piece of the multimedia content;
sending the audio fingerprint of the piece of the multimedia content to a server that is communicatively coupled to the client device, wherein the server is configured for:
determining, based on the audio fingerprint, an identifier of the piece of multimedia content from a set of identifiers for a plurality of pieces of multimedia content pre-stored at the server, each identifier from the set of identifiers identifying at least one piece of multimedia content from the plurality of pieces of multimedia content, wherein the identifier of the piece of multimedia content is determined using a time stream of identifiers including a plurality of time durations and each one of the time stream of identifiers is associated with an identifier of a piece of multimedia content that is broadcast during a corresponding one of the plurality of time durations, and retrieving, based on the identifier of the piece of multimedia content, interactive content associated with the piece of multimedia content and pre-stored in a database associated with the server;

receiving, from the server, the interactive content associated with the piece of multimedia content; and rendering the interactive content to the user of the client device.

9. The client device of claim 8, wherein the content display device is a television located adjacent the client device and the multimedia content is a television program broadcast on the television.

10. The client device of claim 8, wherein the piece of multimedia content is an advertisement of a product being broadcast by the content display device, and the interactive content is an interactive web page enabling the user of the client device to purchase the product through the web page.

11. The client device of claim 8, wherein the server is configured for comparing the audio fingerprint with a set of audio fingerprints associated with the plurality of pieces of multimedia content, each audio fingerprint from the set of audio fingerprint uniquely identifying a respective piece of multimedia content from the plurality of pieces of multimedia content.

12. The client device of claim 8, wherein the plurality of pieces of multimedia content are associated with a group of channels, and the server is configured for:

receiving signals of the multimedia content;
periodically determining, based on the received signals, audio fingerprints of the multimedia content; and
storing the audio fingerprints into a real-time audio fingerprint database such that an audio fingerprint associated with the multimedia content presented via each channel from the group of channels that is stored in the real-time audio fingerprint database is periodically updated.

13. The client device of claim 12, wherein the client device is configured to send a timestamp of the piece of multimedia content to the server, and the server is configured for:

comparing the audio fingerprint with the audio fingerprints stored in the real-time audio fingerprint database to determine a channel from the group of channels via which the piece of multimedia content is presented; and
determining, based on the channel and the timestamp, the identifier of the piece of multimedia content from a predefined database of multimedia content.

14. The client device of claim 13, wherein the predefined database of multimedia content stores an identifier of each piece of multimedia content from the plurality of pieces of multimedia content, and information of at least a channel and a time duration of each piece of multimedia content from the plurality of pieces of multimedia content.

15. A non-transitory computer readable storage medium storing one or more programs, the one or more programs comprising instructions that, when executed by one or more processors of a client device, cause the client device to perform operations comprising:

receiving a user instruction to capture multimedia content broadcast by a content display device that is distinct from the client device;

in response to the user instruction:
recording, in real-time, an audio stream of a piece of the multimedia content broadcast by the content display device;
extracting, from the recorded audio stream, an audio fingerprint of the piece of the multimedia content;
sending the audio fingerprint of the piece of the multimedia content to a server that is communicatively coupled to the client device, wherein the server is configured for:
determining, based on the audio fingerprint, an identifier of the piece of multimedia content from a set of identifiers for a plurality of pieces of multimedia content pre-stored at the server, each identifier from the set of identifiers identifying at least one piece of multimedia content from the plurality of pieces of multimedia content, wherein the identifier of the piece of multimedia content is determined using a time stream of identifiers including a plurality of time durations and each one of the time stream of identifiers is associated with an identifier of a piece of multimedia content that is broadcast during a corresponding one of the plurality of time durations, and
retrieving, based on the identifier of the piece of multimedia content, interactive content associated with the piece of multimedia content and pre-stored in a database associated with the server;
receiving, from the server, the interactive content associated with the piece of multimedia content; and
rendering the interactive content to the user of the client device.

16. The non-transitory computer readable storage medium of claim 15, wherein the content display device is a television located adjacent the client device and the multimedia content is a television program broadcast on the television.

17. The non-transitory computer readable storage medium of claim 15, wherein the piece of multimedia content is an advertisement of a product being broadcast by the content display device, and the interactive content is an interactive web page enabling the user of the client device to purchase the product through the web page.

18. The non-transitory computer readable storage medium of claim 15, wherein the server is configured for comparing the audio fingerprint with a set of audio fingerprints associated with the plurality of pieces of multimedia content, each audio fingerprint from the set of audio fingerprint uniquely identifying a respective piece of multimedia content from the plurality of pieces of multimedia content.

19. The non-transitory computer readable storage medium of claim 15, wherein the plurality of pieces of multimedia content are associated with a group of channels, and the server is configured for:

receiving signals of the multimedia content;
periodically determining, based on the received signals, audio fingerprints of the multimedia content; and
storing the audio fingerprints into a real-time audio fingerprint database such that an audio fingerprint associated with the multimedia content presented via each channel from the group of channels that is stored in the real-time audio fingerprint database is periodically updated.

20. The non-transitory computer readable storage medium of claim 19, wherein the client device is configured to send a timestamp of the piece of multimedia content to the server, and the server is configured for:
  comparing the audio fingerprint with the audio fingerprints stored in the real-time audio fingerprint database to determine a channel from the group of channels via which the piece of multimedia content is presented; and
  determining, based on the channel and the timestamp, the identifier of the piece of multimedia content from a predefined database of multimedia content.

* * * * *